US011842313B1

(12) United States Patent
Ingraham et al.

(10) Patent No.: US 11,842,313 B1
(45) Date of Patent: Dec. 12, 2023

(54) METHOD, SYSTEM AND COMPUTER-READABLE STORAGE MEDIUM FOR CONDUCTING ON-DEMAND HUMAN PERFORMANCE ASSESSMENTS USING UNSTRUCTURED DATA FROM MULTIPLE SOURCES

(71) Applicant: Lockheed Martin Corporation, Bethesda, MD (US)

(72) Inventors: Lorie R. Ingraham, Orlando, FL (US); James H. Crutchfield, Jr., Maitland, FL (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 659 days.

(21) Appl. No.: 16/999,913

(22) Filed: Aug. 21, 2020

Related U.S. Application Data

(63) Continuation of application No. 15/176,121, filed on Jun. 7, 2016, now abandoned.

(51) Int. Cl.
*G06Q 10/0639* (2023.01)
*G06F 16/33* (2019.01)
(Continued)

(52) U.S. Cl.
CPC ... *G06Q 10/06393* (2013.01); *G06F 16/3344* (2019.01); *G06F 40/284* (2020.01); *G06Q 10/0639* (2013.01); *G06Q 10/06395* (2013.01); *G06Q 10/06398* (2013.01); *G06Q 50/205* (2013.01); *G06V 20/41* (2022.01);
(Continued)

(58) Field of Classification Search
CPC ................................................ G06Q 10/06393
See application file for complete search history.

(56) References Cited

U.S. PATENT DOCUMENTS 7,027,621 B1  4/2006  Prokoski
9,596,349 B1  3/2017  Hernandez
(Continued)

OTHER PUBLICATIONS

Adams et al., "Augmenting Virtual Reality," Dec. 2014, Military Technology, vol. 38, No. 12, pp. 16-24 (Year: 2014).
(Continued)

*Primary Examiner* — Van H Oberly
(74) *Attorney, Agent, or Firm* — Foley & Lardner LLP

(57) ABSTRACT

Embodiments include a method and system for conducting human performance assessment comprising memory devices for accessing and storing historical data from multiple sources of unstructured and structured assessment source data for a subject. The unstructured assessment source data includes free-form source data. The system includes a computing system with a user interface presented on a digital display device to enter assessment query (AQ) relating to the subject. The system includes a natural language processing engine to process an unstructured data search model based on the AQ and a semantic reasoner engine to apply unstructured and structured data search model to the assessment domain ontology for the subject to measure human performance and at the same time identify performance gaps. The system includes an assessment report generator to generate a report of the performance and gap assessments wherein the report is configured to be displayed on the display device.

20 Claims, 16 Drawing Sheets

(51) Int. Cl.
*G06F 40/284* (2020.01)
*G09B 9/00* (2006.01)
*G06Q 50/20* (2012.01)
*G06V 20/40* (2022.01)

(52) U.S. Cl.
CPC .............. *G06V 20/46* (2022.01); *G06V 20/47* (2022.01); *G09B 9/00* (2013.01)

(56) References Cited

U.S. PATENT DOCUMENTS

| | | |
|---|---|---|
| 2003/0118978 A1 | 6/2003 | L'Allier et al. |
| 2003/0218696 A1 | 11/2003 | Bagga et al. |
| 2006/0177808 A1 | 8/2006 | Aosawa et al. |
| 2006/0235732 A1 | 10/2006 | Miller et al. |
| 2013/0166303 A1 | 6/2013 | Chang et al. |
| 2014/0188574 A1* | 7/2014 | Luca ................ G06Q 10/06393 705/7.39 |
| 2014/0220527 A1 | 8/2014 | Li et al. |
| 2014/0282586 A1* | 9/2014 | Shear ...................... G06F 40/00 718/104 |
| 2014/0324721 A1 | 10/2014 | Rennison et al. |
| 2015/0056591 A1 | 2/2015 | Tepper et al. |
| 2016/0196534 A1 | 7/2016 | Jarrett et al. |
| 2017/0083623 A1 | 3/2017 | Habibian et al. |
| 2017/0235895 A1* | 8/2017 | Cox ....................... G16H 40/20 705/2 |

OTHER PUBLICATIONS

Hogervorst et al., "Combining and comparing EEG, peripheral physiology and eye-related measures for the assessment of mental workload," 2014, Frontiers in Neuroscience, vol. 8, Article 322, pp. 1-14 (Year: 2014).

Schnell et al., "Neurophysiological Workload Assessment in Flight," 2008, IEEE/AIAA 27th Digital Avionics Systems Conference, IEEE, pp. 4.B.2-1-4.B.2-14 (Year: 2008).

Schnell et al., "Quality of Training Effectiveness Assessment (QTEA); A Neurophysiologically Based Method to Enhance Flight Training," 2008, IEEE/AIAA 27th Digital Avionics Systems Conference, IEEE, pp. 4.D.6-1-4.D.6-13 (Year: 2008).

U.S. Office Action on U.S. Appl. No. 15/176,121 dated Dec. 11, 2019 (48 pages).

U.S. Office Action on U.S. Appl. No. 15/176,121 dated Feb. 28, 2019 (50 pages).

U.S. Office Action on U.S. Appl. No. 15/176,121 dated May 21, 2020 (50 pages).

U.S. Office Action on U.S. Appl. No. 15/176,121 dated Sep. 17, 2018 (51 pages).

* cited by examiner

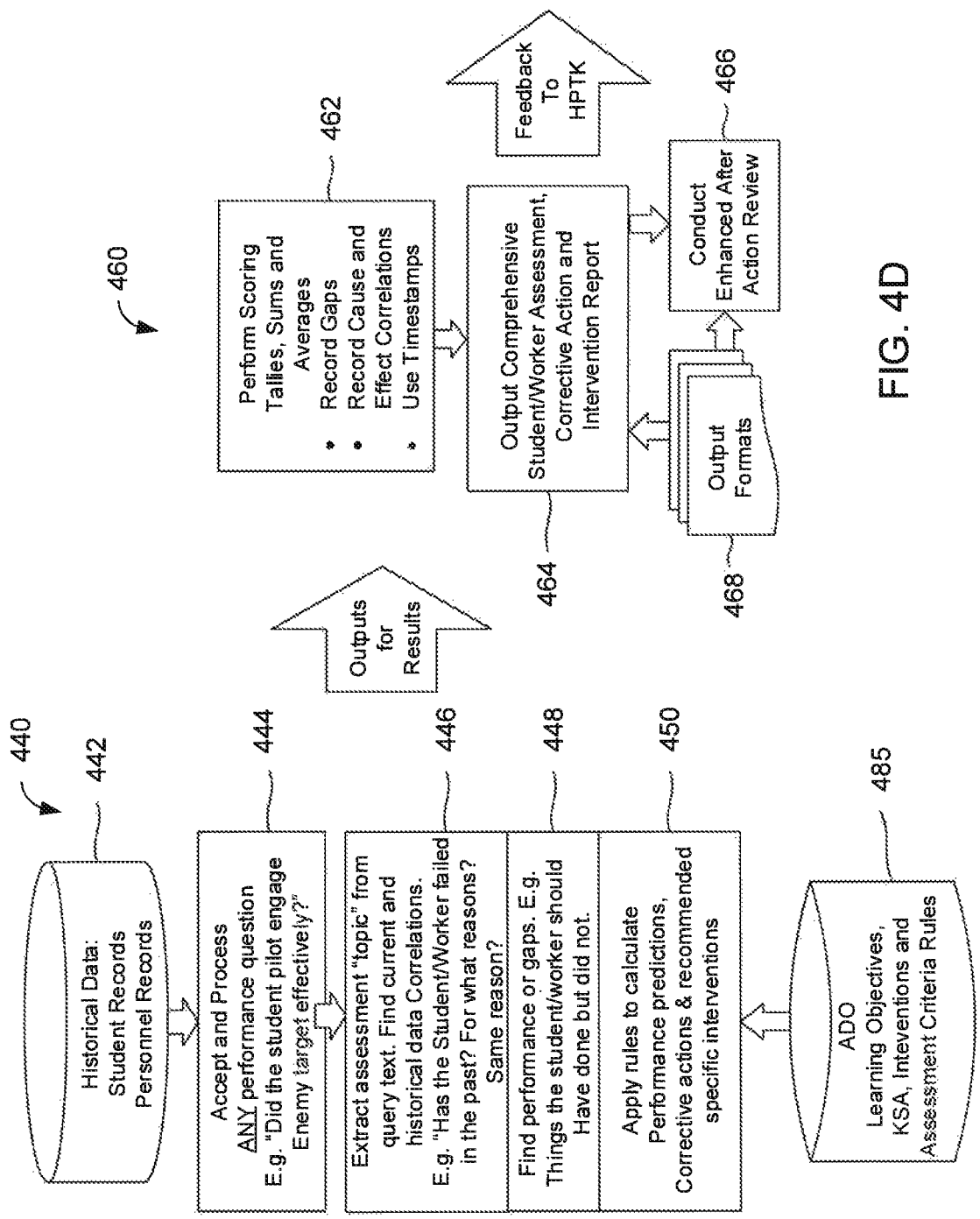

FIG. 5B

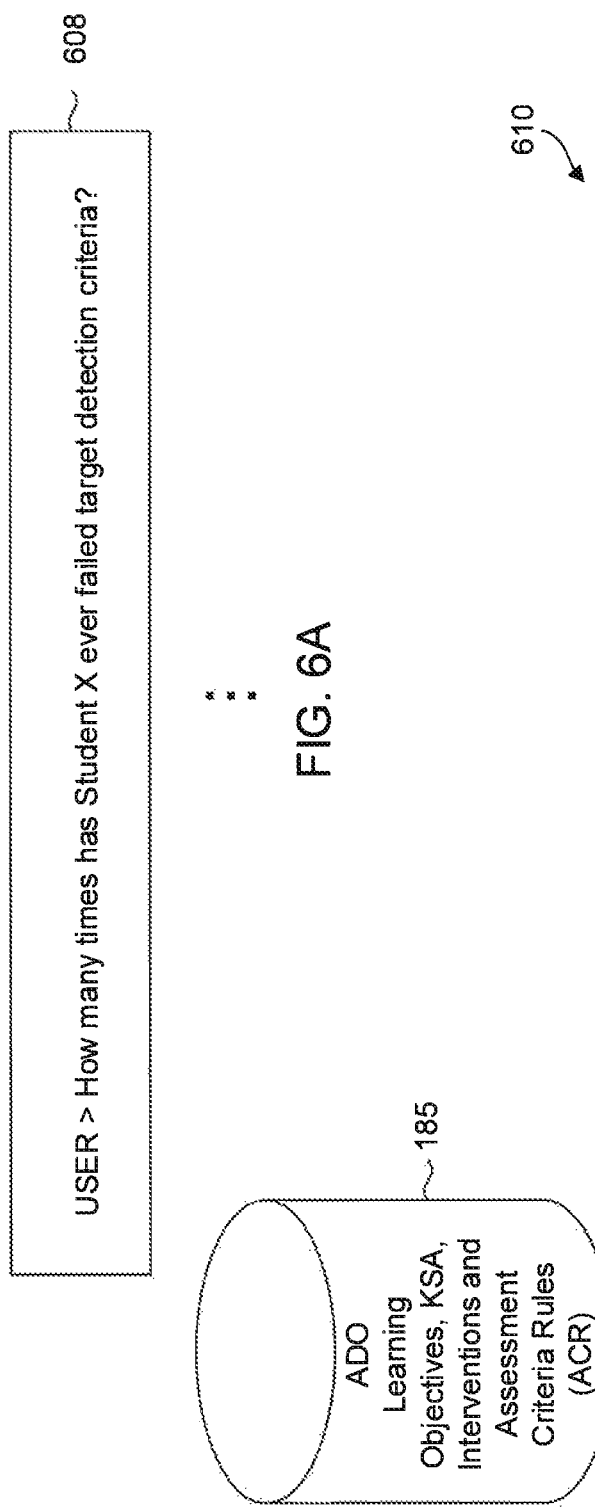

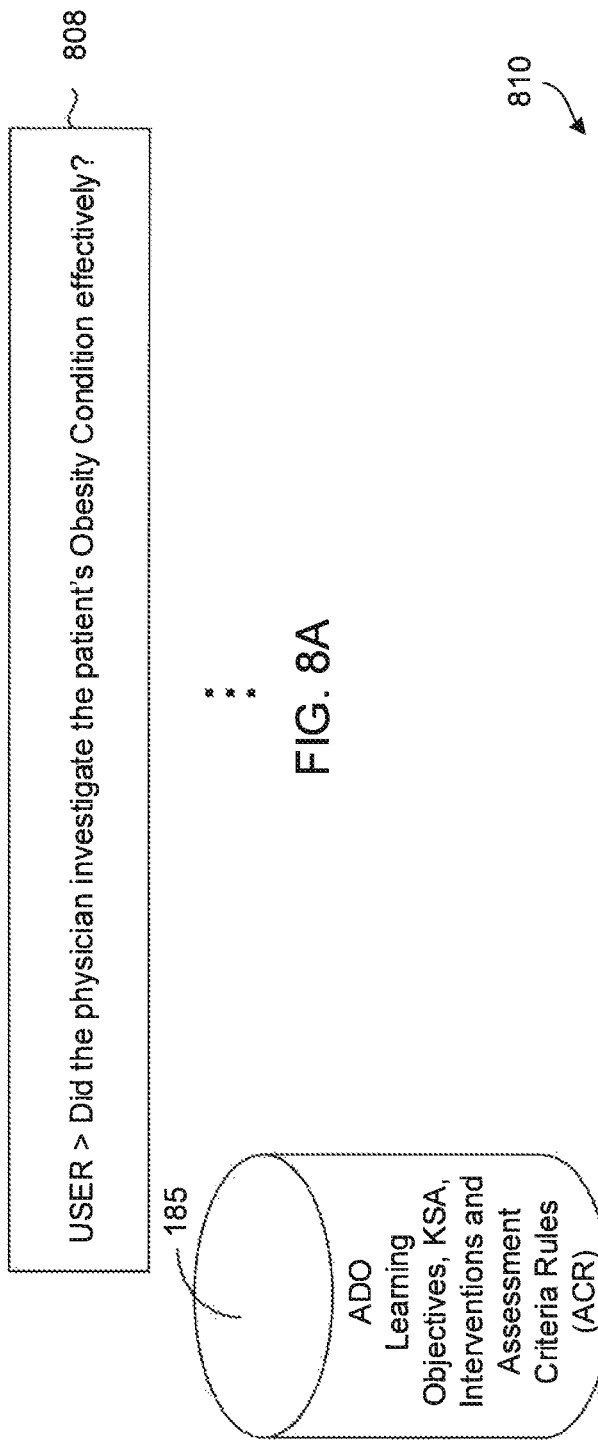

METHOD, SYSTEM AND COMPUTER-READABLE STORAGE MEDIUM FOR CONDUCTING ON-DEMAND HUMAN PERFORMANCE ASSESSMENTS USING UNSTRUCTURED DATA FROM MULTIPLE SOURCES

CROSS REFERENCE TO RELATED APPLICATIONS

This application is a continuation of U.S. application Ser. No. 15/176,121, filed on Jun. 7, 2016, and entitled "METHOD, SYSTEM AND COMPUTER-READABLE STORAGE MEDIUM FOR CONDUCTING ON-DEMAND HUMAN PERFORMANCE ASSESSMENTS USING UNSTRUCTURED DATA FROM MULTIPLE SOURCES," which is incorporated herein by reference in its entirety.

BACKGROUND

The embodiments relate to a method, system and non-transitory, tangible computer-readable storage medium for conducting on-demand human performance assessments or gap assessment using unstructured data from multiple sources.

As organizations become increasingly digitized, there is an extraordinarily rich amount of data that can be used for performance assessments of individuals and teams. However, it is difficult to combine unrelated and un-integrated performance data into a combined, net-performance measure or a scaled score to evaluate specific knowledge, skills, and attitude (KSA) criteria and goals. Current solutions are "hard-coded," laborious and unsustainable because their interfaces are very specific and "prescribed."

With continued initiatives towards integrated Live, Virtual, and Constructive (LVC) training, there is an increasing need to understand human performance both within and across LVC environments. The problem with current data formats across LVC is that they are often incompatible, with no common specification across systems. As a result, it is very difficult to effectively and efficiently identify, extract, and track LVC performance data, which impedes efforts to assess and combine trainee performance across multiple LVC training events and exercises. It is difficult to pinpoint specific areas where the trainee or worker is deficient, improving or proficient across different types of training and classroom events. Many assessment capabilities assess what was done, but fail to identify what the learner or performer should have done and failed to do.

SUMMARY

Embodiments herein relate to a method, system and non-transitory, tangible computer-readable storage medium for conducting on-demand human performance assessments using structured and unstructured data from multiple sources. An aspect of the embodiments include a system comprising: one or more free-form event data (FFED)-to-text converters which convert non-text event data into text to create unstructured performance source data for a subject, the non-text event data including free-form source data; memory devices for storing human performance data from multiple sources of structured performance source data and the unstructured performance source data for the subject; and a computing system including: a user interface displayed to a user on a display device to enter an assessment query (AQ) relating to the subject; an assessment domain ontology (ADO) database to store mappings between at least one of learning objectives and performance objectives and key words and terms; a natural language processing (NLP) search engine to develop a search model based on the AQ; a semantic reasoner engine to apply the search model to the unstructured performance source data and the structured performance source data for the subject to identify and score gap assessments; and an assessment report generator to generate a report of the gap assessments wherein the report is configured to be displayed on a display device.

An aspect of the embodiments include a computer-implemented method, comprising: converting non-text event data into text to create unstructured performance source data for a subject, the non-text event data including free-form source data; storing in memory devices multiple sources of unstructured performance source data and structured performance source data for a subject; receiving, through a user interface displayed on a display device, an assessment query (AQ) relating to the subject; storing in an assessment domain ontology (ADO) database mappings between learning and performance objectives and key words and terms; performing natural language processing (NLP), by an NLP search engine of a computing system, to develop a search model based on the AQ; semantically reasoning, by a semantic reasoner engine of the computing system, to apply the search model to the unstructured performance source data and the structured performance source data for the subject to identify and score gap assessments; and generating, by an assessment report generator, a report of the gap assessments wherein the report is configured to be displayed on a display device.

In another aspect of the embodiment includes a non-transitory, tangible computer-readable storage medium having instructions stored thereon that, if executed by a computing system with one or more processors, cause the computing system to perform operations comprising: converting non-text event data into text to create unstructured performance source data for a subject, the non-text event data including free-form source data; storing, in memory devices, multiple sources of unstructured performance source data and structured performance source data for a subject; receiving, through a user interface displayed on a display device, an assessment query (AQ) relating to the subject; storing an assessment domain ontology (ADO) database to hold mappings between learning and performance objectives and key words and terms; performing natural language processing (NLP), by an NLP search engine of the computing system, to develop a search model based on the AQ; semantically reasoning, by a semantic reasoner engine of the computing system, to apply the search model to the unstructured performance source data and the structured performance source data for the subject to identify and score gap assessments; and generating, by an assessment report generator, a report of the gap assessments wherein the report is configured to be displayed on a display device.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 4C illustrates a flow diagram of a process for semantic reasoner rules;

FIG. 4D illustrates a flow diagram of a process for assessment report generation;

FIG. 5B illustrates a flow diagram of a human performance training, capture, tracking and assessment system;

FIG. 6A illustrates an assessment query for a performance assessment entered using the user query interface of the HPA system;

FIG. 6B illustrates an unstructured search model based on the assessment query of FIG. 6A;

FIG. 8A illustrates an assessment query for a performance assessment entered using the user query interface of the HPA system;

FIG. 8B illustrates an unstructured text search model based on the assessment query of FIG. 8A;

DETAILED DESCRIPTION

Figure 1A:
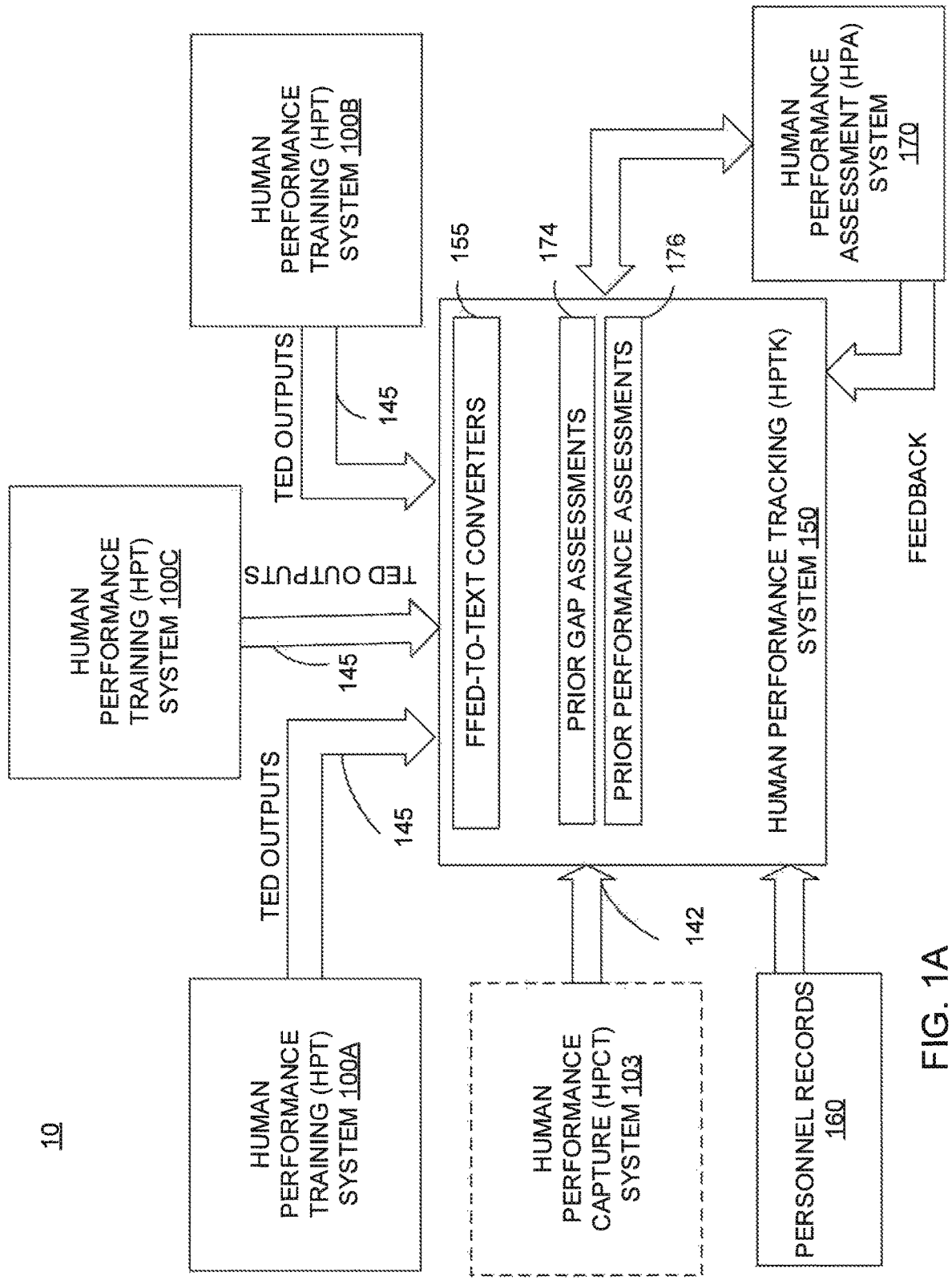
FIG. 1A illustrates a block diagram of an human performance training, tracking and assessment system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The invention applies Natural Language Processing (NLP) to parse and interpret user queries about human performance. NLP is used to find text segments that are then used as search words against multiple sources of performance assessment data. The invention also applies a structured domain data model ontology, named assessment domain ontology (ADO) that enables the execution of algorithms that identify performance-relevant content and previous performance scores that provide evidence of human performance at machine processing speed. The system also has the capability to calculate new performance scores as relevant performance data is found. The invention improves and extends the manner in which historical performance data is found and combined towards an assessment goal.

By applying NLP techniques, the system can efficiently search, find and combine human performance data words and terms for scoring specific knowledge, skill and attitude (KSA) criteria from multiple assessment data sources from not only LVC training, but also classroom lessons outcomes, computer-based instruction, After-Action Review/Debrief and student records data in response to a performance query expressed in natural language. In one embodiment, other words and terms related or similar to the performance search words can be identified because dictionary, glossary or thesaurus information can be stored in the assessment domain ontology (ADO) database to automatically expand the performance search lists.

The embodiments herein are directed to improvements in computer-related technology and, specifically, to the assessment of trainees and students during training, athletes and professionals performing their job. The improvements gathers numerous sources of performance data including one or more of training data, employee records and free-form assessment data and converts and correlates such data into a machine readable form for efficient and rapid search on-demand for gaps or performance metrics.

FIG. 1A illustrates a block diagram of a human performance training, tracking and assessment (HPTTA) system 10. By way of non-limiting example, an employee may first be trained in a classroom. The training plan may further train the employee on a desktop. In some organizations, training may be further advanced with simulation type training. The training may include live training or on-the-job training with certain equipment.

The HPTTA system 10 may comprise one or more human performance training (HPT) systems 100A, 100B and 100C.

The system 10 may include one HPT system or many HPT systems. Each HPT system 100A, 100B and 100C may produce and output training event data (TED) denoted as TED outputs 145, for a trainee (i.e., trainee 205 in FIG. 2) which is logged and may be timestamped. One or more of the HPT systems 100A, 100B and 100C may employ devices configured for human motion capture, biometric sensing and other advanced human performance capture systems all of which may dramatically increase the amount of available textual performance data for assessing a trained employee, a perspective new hire, a trainer, a team, soldier, a skilled professional, etc. A trainee may be a subject under evaluation or assessment.

The TED outputs 145 may be communicated to a human performance tracking (HPTK) system 150 wherein one or more of the TED outputs 145 may include free-form event data (FFED) for a training session/event. The TED outputs may include structured performance source data, such as training data. The HPTK system 150 may include a FFED-to-text converters 155 to convert the FFED into a text format, hereinafter referred to as FFED text. The FFED text may be in an unstructured format and may sometimes be referred to as unstructured performance source data. The HPTTA system 10 may include a human performance capture (HPCT) system 103 configured to output unstructured source data 142. The HPCT system 103 is represented in a dashed block, as in some embodiments, serves as a stand-alone performance capture device which may be employed separately from and in addition to human performance capture by the HPT systems. The FFED-to-text converters 155 may provide computer vision for rapid and parallel capture of events from multiple sources and subjects, simultaneously. The unstructured source data may be computer generated for rapid processing. The unstructured source data may be matched and correlated with structured performance source data.

The HPTTA system 10 may further comprise a human performance assessment (HPA) system 170 wherein assessments of the trainee (i.e., soldier, employee, trainer, skilled professional, or team) may be conducted. Gap assessments are identified by human performer omissions from expected actions or expected behavior, The HPA system 170 may allow for on-demand gap assessments or on-demand performance assessments to be conducted. In some embodiments, the HPA system 170 is maintained with up-to-date structured performance data, unstructured performance data and personnel records. Thus, at any time (or on-demand), a performance assessment or gap assessment can be conducted. In some embodiments, the performance assessment or gap assessment may be performed periodically, such as, without limitation, daily, weekly, quarterly, yearly or some other increment of time. By way of non-limiting example, when evaluating training of a person, assessments may be performed daily or weekly so that corrective action can be employed for successful completion of a course. By way of non-limiting example, assessments may be performed on-demand for the military, first responders, or medical personnel to assess suitability to rapidly deploy a person or team in a disaster area or in a hazardous/dangerous situation. By way of non-limiting example, the on-demand assessments may serve to schedule persons or teams for training to maintain performance, improve performance or advance skill sets. By way of non-limiting example, the on-demand gap assessments may serve as a promotion tool or hiring tool, in some industries. By way of non-limiting example, the on-demand gap or performance assessments may serve as team building tool to meet a certain job/task function.

The training assessments may include performance gap assessments to identify what the trainee should have done, but failed to do. The HPA system 170 may also query personnel records 160 and receive information for use in determining one or more of a gap assessment and performance assessment through the HPTK system 150. After the HPA system 170 performs a performance assessment and/or gap assessment, the results are feedback to and tracked by the HPTK system 150 so that future performance assessments and/or gap assessments have the results of a prior performance assessments data 176 or prior gap assessments data 174 to follow performance trends and/or gap trends, by way of non-limiting example.

In some embodiments, the personnel records 160 are managed, tagged and maintained by the HPTK system 150.

Each of the HPT system (i.e., HPT system 100A, 100B or 100C), the HPTK system 150, and the HPA system 170 will be described in more detail below.

Figure 1B:
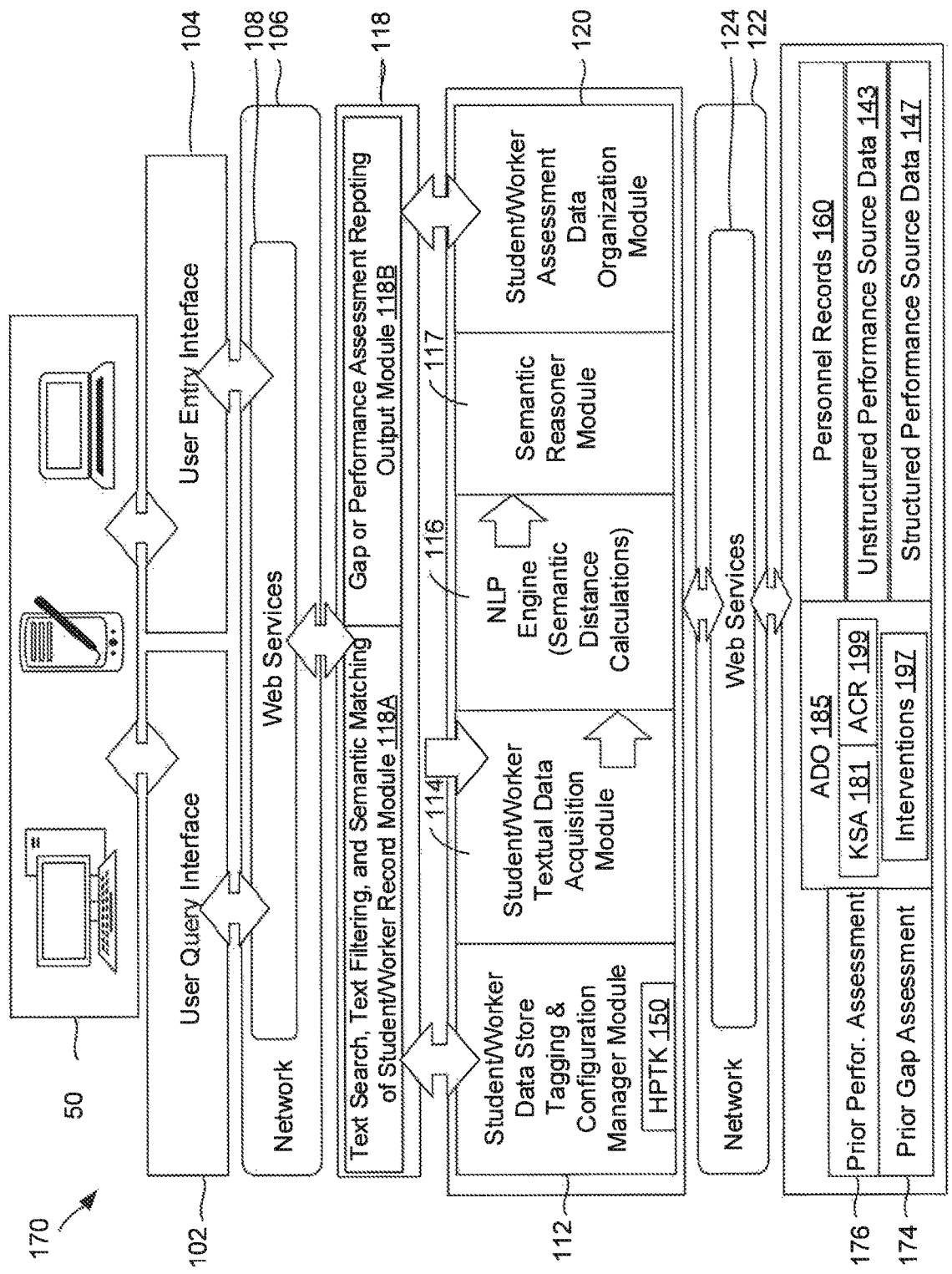
FIG. 1B illustrates a block diagram of the human performance assessment system.

FIG. 1B illustrates a block diagram of the human performance assessment (HPA) system 170. The HPA system 170 may be configured to perform the processes 400, 420, 440 and 460 described below in relation to FIGS. 4A, 4B, 4C and 4D. The HPA system 170 may be configured to timestamp and store prior performance assessments and/or prior gap assessments previously conducted for future recall. The HPA system 170 may include a computing device 50 (i.e., computing device 950 of FIG. 9) or computing system with one or more processors and memory devices with instructions for causing the processors to carry out the acts described herein.

Figure 6C:
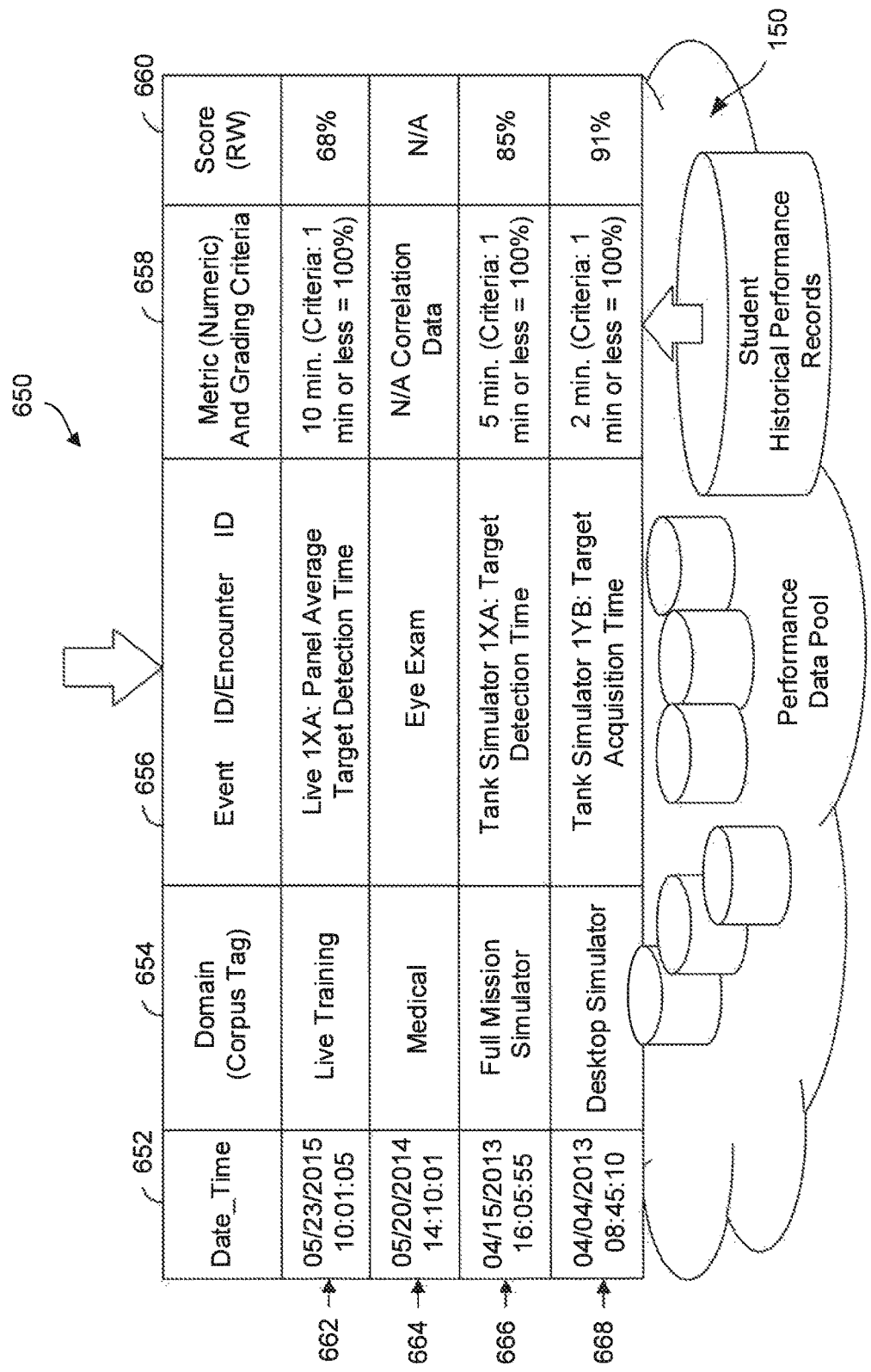
FIG. 6C illustrates a performance assessment report based on the unstructured search model FIG. 6B.
Figures 7A, 7B:
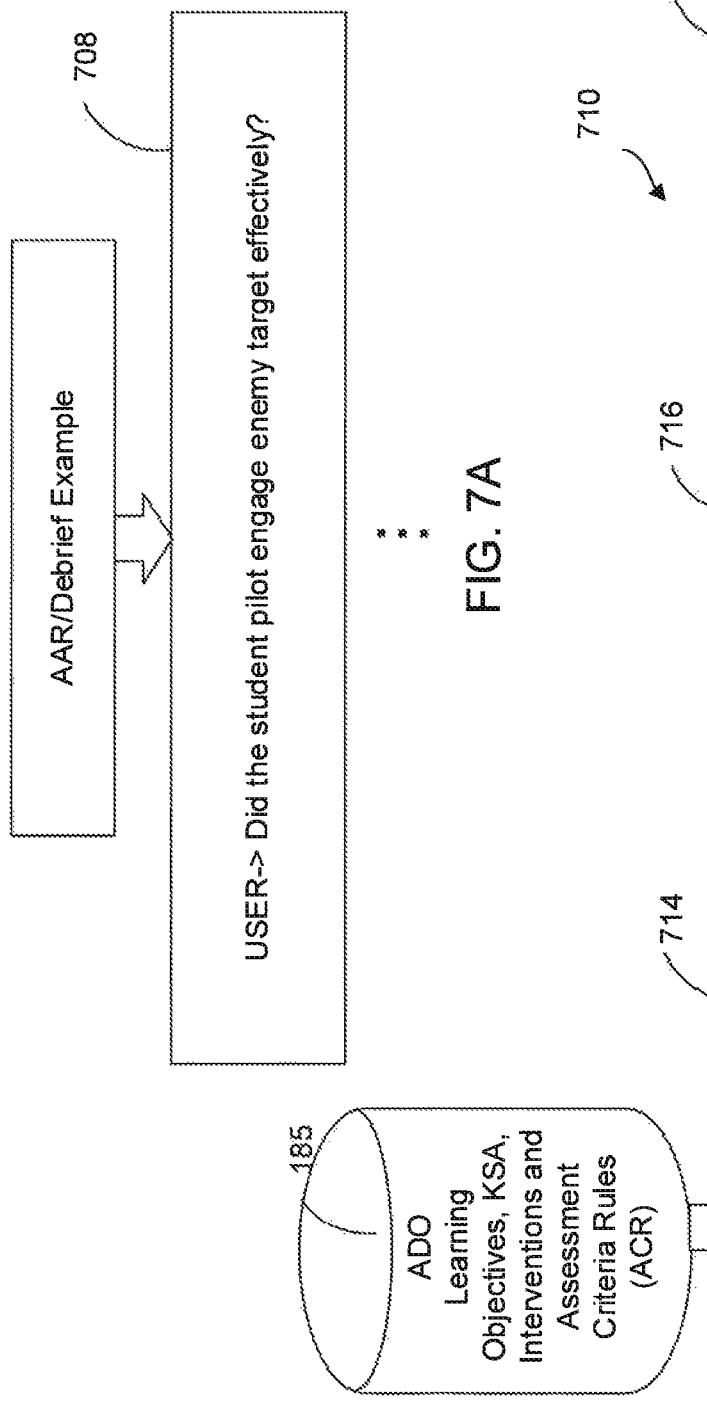
FIG. 7A illustrates an assessment query for a performance assessment entered using the user query interface of the HPA system.
FIG. 7B illustrates an unstructured text search model based on the assessment query of FIG. 7A.

The HPA system 170 may include a user query interface 102 such as for entering assessment query described in more detail in relation to FIGS. 6A, 7A and 8A. The HPA system 170 may include a user entry interface 104. The user query interface 102 and user entry interface 104 may be web-based user interfaces configured to access a network 106 such as a local area network (LAN), wide-area-network (WAN), private network or public network. The network 106 may be web-based according to an Internet protocol. In some embodiments, a web-based service 108 may be employed.

In some aspects, the HPA system 170 may be standalone on a user's computing device 50.

A user interacts with system 170 via a computing device 50. The computing device 50 may include a personal computer (PC), a portable computing device which is hand-held, and/or a laptop. The computing device 50 may be web-enabled.

A subject matter expert (SME) may describe task requirements in the form of interview transcripts using the user entry interface 104. The user entering detail job duties or performance activities may use the user entry interface 104. The user entry interface 104 may be a graphical user interface (GUI).

The user query interface 102 may be a graphical user interface (GUI) and may also include additional interfaces for displaying the unstructured search model described below in FIGS. 6B, 7B and 8B. The user query interface 102 may include interfaces to display the assessment report along with various tools such as printing the report and customizing the report format.

The HPA system 170 may interface with a student/worker data store tagging and configuration manager module 112. The student/worker data store tagging and configuration manager module 112 may allow a machine, an administrator or other user with permissions to tag (e.g., with timestamps) and configure in database tables student/worker data stored and managed in the HPTK system 150. The manager 112 may store and tag as appropriate the FFED text. The HPA system 170 may include a student/worker textual data acquisition module 114 to access stored data from database 575 such as when an assessment is conducted on-demand. The manager module 112 and acquisition module 114 may access data through the HPTK system 150. The acts of the acquisition module 114 corresponds at least to acts associated with block 406 of FIG. 4A. The acquisition module 114 allows the user to manage the transfer of assessment data to text files. The transfer may include transferring performance scores, progression, self-notes or 3 party notes, biometric readying, and other source data stored to a database (i.e., database 575) to the NLP 116. The transfer may be automatically, semi-automatic or manually performed in some instances.

The HPA system 170 interfaces with the HPTK system 150 to access the performance source data for an individual, employee, or team, as previously described. In an embodiment, the HPA system 170 accesses the databases of the HPTK system 150 through a network 122. Network 122 may be a local area network (LAN), wide-area-network (WAN), a private network or a public network. The network 122 may be web-based according to an Internet protocol. In some embodiments, a web-based service 124 may be employed such as, without limitation, cloud storage services. In some embodiments, the network may be an intranet.

The HPA system 170 may access the structures performance source data 147, employee or personnel records 160 and unstructured performance source data 143, prior performance assessments data 176 and prior gap assessments data 174 through network 122. Primary and secondary words/terms may be stored in a common assessment domain ontology (ADO) database 185 which is accessible through network 122.

The HPA system 170 may include an NLP engine 116 with semantic distance calculations and semantic reasoner module 117. The NLP engine 116 may be a computing device or one or more processors to perform the processes described herein. The HPA system 170 may include a student/worker performance data organization module 120 for the generation of performance assessment reports and/or gap assessment reports. The NLP engine 116 may use a semi-supervised search model, meaning that both labeled and unlabeled performance data can be used.

The HPA system 170 includes module 118 having a text search, text filtering and semantic matching module 118A of a student/worker record configured to perform text searching and filtering based on the user input through the user query interface 102 and/or the user entry interface 104. The text search, text filtering and semantic matching module 118A also may include a semantic matching in response to the user input through the user query interface 102 and/or the user entry interface 104. The module 118 also includes a gap or performance assessment reporting output module 118B such as for retrieving gap assessments or performance assessments previously generated and generating an output of any performance or gap assessments on a display and/or by printer. The manager module 112 and acquisition module 114 may be interfaced with the module 118A. The data organization module 120 is also interfaced with the module 118B. The text search, filtering and semantic matching may be performed based on the search model such as shown in FIGS. 6B, 7B and 8B.

The NLP engine 116 may be interfaced with the semantic reasoner module 117 and the acquisition module 114. The semantic reasoner module 117 may be interfaced with the data organization module 120. The semantic reasoner module 117 may include one or more processors and instructions executed by the processor to perform the acts described herein. The reasoner module 117 may access the ADO database 185 to access learning objectives, KSA 181, interventions 197 and/or assessment criteria rules (ACR) 199 stored in memory. Interventions 197 may include at least one of additional training, obtaining medical evaluations, wearing or using protective gear, wearing or using performance enhancing devices, wearing or using medical devices (such as glasses), etc. to assist in improvements of a performance or bridge a gap in performance. Interventions may vary based on industry, job criteria, etc. Interventions may include corrective actions (CA) which may include at least one of additional training, certain anatomical changes, certain lifestyle changes, certain physiological changes, identification of methods to improve performance, identification of state of the art technology to improve performance, etc. to increase performance or bridge a gap. The ADO may also include knowledge, skills and attitude (KSA) parameters and/or identifiers 181 stored in a database. The ontology in some embodiments is structured for each domain. The ADO include multiple domain ontologies. The KSA parameters and/or identifiers 181 provide key terms that can also be used by the NLP engine for assessment criteria and goal searches. The assessment criteria (ACR) rules will be described in more detail in relation to FIGS. 6C, 7C and 8C. The ADO provides the ontology for development of the search models for text searching, filtering and semantic matching (illustrated in FIGS. 6B, 7B and 8B) based on the user's inquiry.

Figure 2:
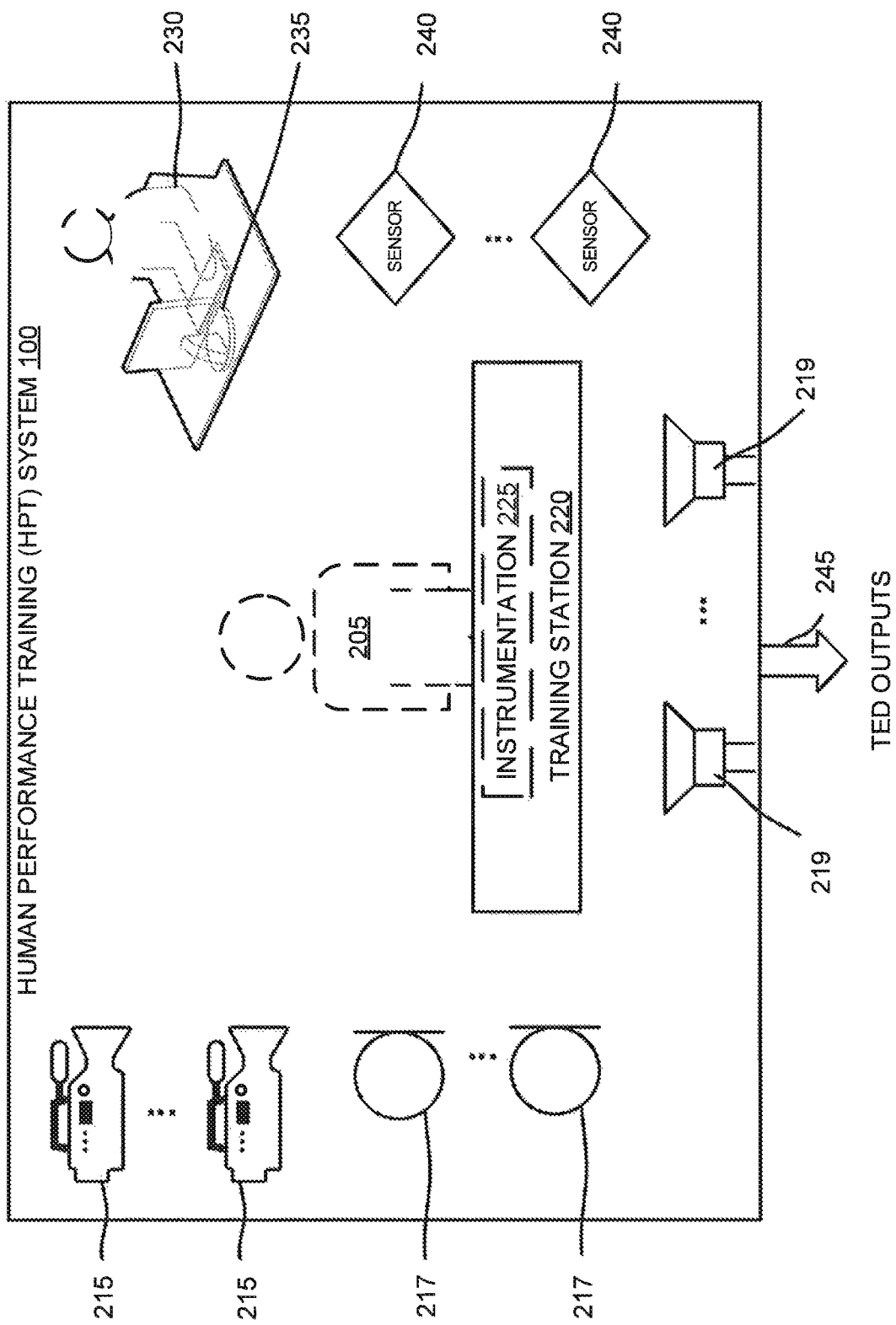
FIG. 2 illustrates a block diagram of a human performance training system.

Referring now to FIG. 2, the human performance training (HPT) system 100 may include a training station 220. The training station 220 may include instrumentation 225 depicted in dashed lines to denote that instrumentation 225 is optional. The trainee 205 is shown in dashed lines as the trainee 205 is not part of the HPT system 100. Instead the trainee 205 may interact with HPT system 100. The HPT system 100 may include one or more of video capture devices 215, voice or audio capture devices 217, audio output devices 219 and one or more sensors 240 to create free-form event data (FFED).

The HPT system 100 may further include a trainer station 235 having a computing device. The trainer station 235 may be operated by a trainer 230, subject matter expert (SME) or others. The trainer 230 is also represented in dashed lines as the trainer 230 is not part of the HPT system 100 but interacts with components of the HPT system 100.

In an embodiment, the trainee 205 may be a team of trainees to be trained together. The training station 220 may include one or more training device components. The training station 220 may be a single device with multiple units which are operated by a team at the same time. In an embodiment, the training station may include multiple units operated by one trainee in sequence. In an embodiment, the trainee may operate multiple components of the training station at once.

The HPT system 100 may be configured for military training wherein the training station 220 and instrumentation 225 may be configured as a simulator such as without limitation, for flight simulators, vehicle simulators, ship simulators, gun simulator, medical training simulators, etc., to produce structured performance source data 147.

The training station 220 may be a desktop training system including a computing device. Desktop training may be computer based training (CBT) platform. The training station 220 may include virtual and immersive simulation training platform. The training station 220 may include constructive simulation training platform. The training station 220 may include a live training platform. The training station 220 may include an embedded training platform. The training station 220 may include virtual reality (VR) platform or augmented reality (AR) platform. The training station 220 may include, without limitation, AR glasses, AR googles, immersive googles, and VR glasses. The training station 220 may include helmets with heads up display (HUD) devices or visors.

The training station 220 and/or instrumentation may be worn by the trainee 205 may be body supported or wearable. The training station 220 and/or instrumentation may be hand-held by the trainee 205.

The HPT system 100 may be configured for medical training wherein the training station 220 with instrumentation 225 may include medical equipment, medical equipment simulator, patient simulator, mannequins, etc. The training station 220 may be placed in or part of a live medical or clinical setting. The trainee 205 may be a doctor, nurse practitioner, surgeon, nurse, nursing aid, or other medical professional.

The HPT system 100 may be configured for on-the-job training wherein the training station 220 with instrumentation 225 includes equipment to train an employee on machines or equipment necessary to carry out the duties of employment, including without limitation, duties associated with a soldier, law enforcement, healthcare, and first responders.

The training station 220 is configured to capture data in response to the trainee's interactions with the training station 220 to perform a certain training objective or performance objective.

The HPT system 100 may be configured for athletic training for athletes. The trainee 205 may be an athlete. The training station 220 may include sports equipment.

In an embodiment, the training station 220 may include embedded sensors, accelerometers, gyroscopes and/or other inertial navigational systems that may collect and report human performance measures.

Figure 9:
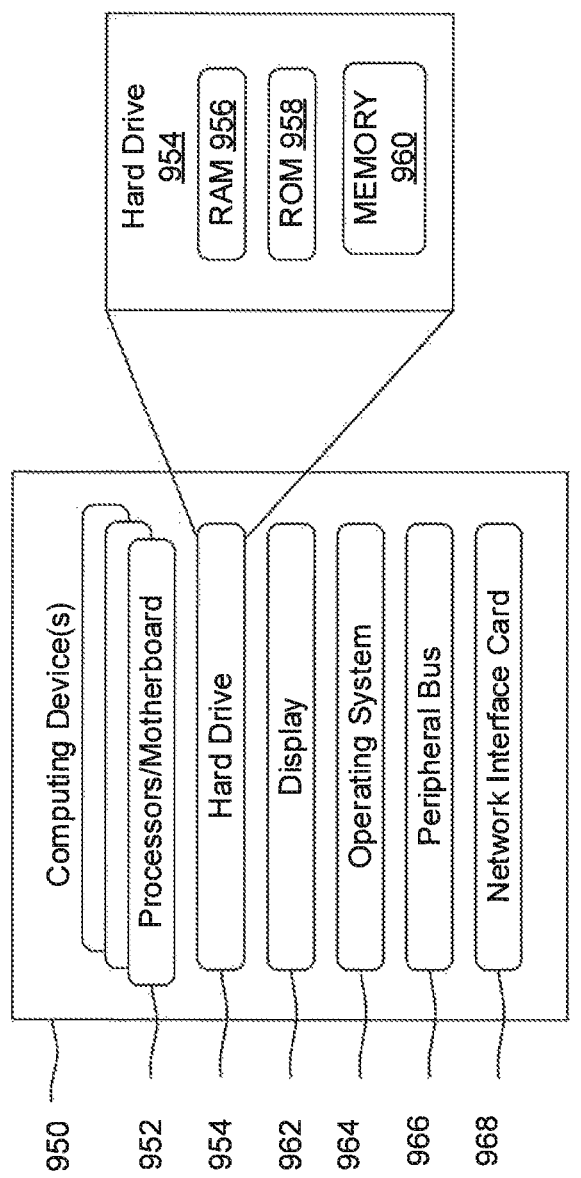
FIG. 9 illustrates a block diagram of a computing device.

In an embodiment, the training station 220 may include a computing device such as described in more detail in FIG. 9, with instrumentation 225. The instrumentation 225 may include a touch screen, mouse, knobs, tactile and haptic device which when actuated produces training event data that may be captured.

During training, the one or more video capture devices 215 may capture video of the training event or session. The one or more video capture devices 215 may capture motion of the trainee 205. The voice or audio capture devices 217 may include a microphone. The voice or audio capture devices 217 may capture the communications within the HPT system 100. The voice or audio may include one or more of the voice from the trainee and the trainer converted to text. The audio may include audio from within the HPT system 100 including sound effects or other sounds produced by the HPT system 100.

The audio output devices 219, such as without limitation, speakers may produce audio sounds to provide commands to the trainee 205 or to produce sound effects that can be logged and timestamped. The one or more sensors 240 may capture sensed data including one or more biometric sensors may sense eye gaze and eye tracking. The biometric sensors may sense pupil dilation. The sensors may sense temperature, heart rate, pulse, or other physiology of the trainee 205.

The sensors 240 may include sensors to detect one or more environmental conditions including one or more of ambient temperature, air quality, chemical components, etc.

The sensors 240 may sense one or more aspects of the training station 220 to determine performance or training events.

The HPT system 100 may produce training event data (TED) and includes one or more training event data (TED) outputs 245. The TED outputs 245 may include one or more forms of free-form event data (FFED). The HPT system 100 may produce structured performance source data such as from a simulator or computing device and unstructured performance source data such as FFED. By way of non-limiting example, the HPT system 100 may include one or more of classroom event scores data, computer based training (CBT) and trainer event scores data, simulator logged outputs data, instructor logs/notes data, augmented reality (AR) reaction data, biometric sensor recordings data, student/team/trainee logs and notes data, after action debrief (AAD) data, motion capture/video recordings data and/or audio recordings data.

Some training system may include aircraft or training station sensors to capture aircraft and weapons state in a simulator and/or aircraft. Human performance may be captured and timestamped with physiological sensors such as without limitation sensors for eye gaze analysis, electrocardiogram (ECG) capture; and respiration measurements. By way of non-limiting example, the eye gaze analysis converted to text may be used for tracking visual information, acquisition strategy and visual workload. Electrocardiogram (ECG) capture may be used for waveform analysis of heart in embedded phase space which may provide a consistent indication of cognitive workload. Respiration may be measured by amplitude and frequency and may provide supporting data for ECG capture.

The HPT system 170 may employ voice recordings which may provide communications and accuracy for after-action review and analysis. Event flags may be used. Data may be assimilated from an HLA federation wherein HLA stand for high-level architecture. Users can insert timestamped event tags and markers. All data may be synchronized with a relational database for use in real-time and during After Action Review (AAR). Data can be retrieved and analysis performed on the basis of complex event queries.

The HPT system 100 is interfaced with the HPTK system 150 as will be described in more detail below in relation to FIG. 3.

Figure 3:
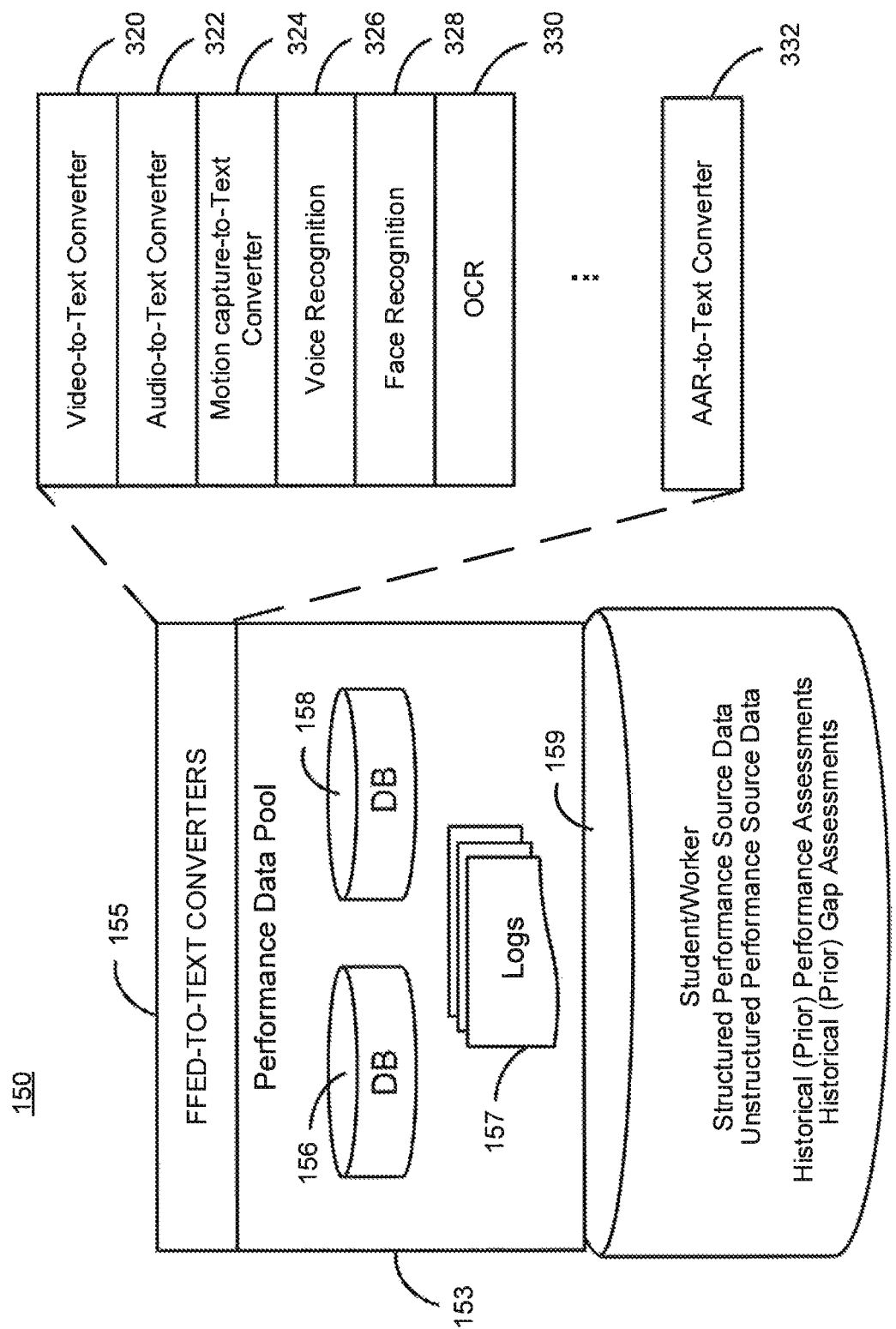
FIG. 3 illustrates a block diagram of a human performance tracking system.

FIG. 3 illustrates a block diagram of a human performance tracking (HPTK) system 150. The HPTK system 150 may store data from multiple sources. The HPTK system 150 may include one or more memory devices 156, 158 and logs 157. The one or more memory devices 156, 158 and logs 157 being collectively referred to as a performance data pool 153. The performance data pool 153 may further include historical (prior) performance assessment data and historical (prior) gap assessment data which may be stored in one or more memory devices represented at reference 159. The performance data pool may include structured performance source data and unstructured performance source data.

The HPTK system 150 is configured to receive the one or more training event outputs 145 and may convert those outputs which are not in text format into a text format. The HPTK system 150 may be a data storage system.

For example, training event data output 145 may include augmented reality reactions (ARR) which are converted to text by an ARR-to-text converter 332. The HPTK system 150 may use optical character recognition (OCR) 330 for scanned documents such as notes to convert data in scanned documents into text. The HPTK system 150 may convert video recordings-to-text by a video-to-text converter 320. The HPTK system 150 may convert audio recordings-to-text by an audio-to-text converter 322.

The biometric sensor recordings data, student/team/trainee logs and notes data, after action debrief (AAD) data, motion capture-to-text data, video recordings-to-text data and/or audio recordings-to-text data.

The HPTK system 150 may include a FFED-to-text converter 155. The FFED-to-text converters 155 may include one or more of optical character recognition (OCR) 330, audio-to-text converter 322 and video-to-text convert 320. The FFED-to-text converters may include ARR-to-text converter 332 to convert activities associated with an augmented reality reactions into text.

The motion capture-to-text converters 324 may convert motion and movement of athletes, for example, or other individuals where physical performance is captured, tracked and assessed, into text describing their movements.

The HPTK system 150 may include voice recognition modules 326 and face recognition modules 328 as part of the FFED-to-text converters 155 so that team members or other individuals may be differentiated.

The FFED-to-text converters 155 may be alternately be moved to the HPA system 170. In some embodiments, one or more of the FFED-to-text converters 155 may be in the HPA system 170 while others are in the HPTK system 150. In some embodiments, one or more of the FFED-to-text converters 155 may reside in the HPT systems 100.

Figures 4A, 4B:
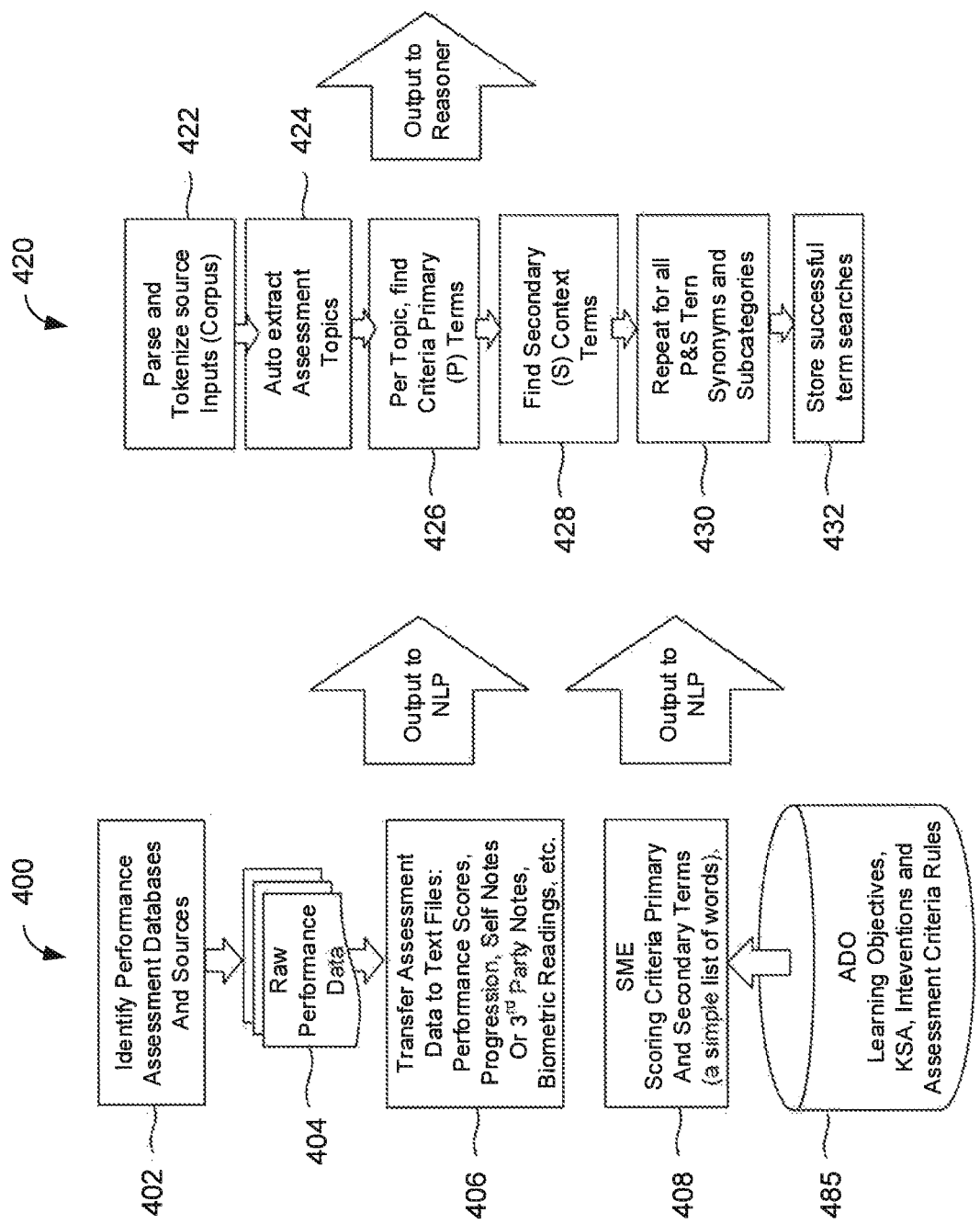
FIG. 4A illustrates a flow diagram of a process for structured and unstructured textual performance data search and extraction.
FIG. 4B illustrates a flow diagram of a process for natural language processing (NLP) of the structured and unstructured performance data search results.

FIG. 4A illustrates a flow diagram of a process 400 for structured and unstructured textual performance data capturing. The blocks of processes described herein may be performed in the order shown or in a different order. One or more blocks may be added or deleted. In some embodiments, one or more of the blocks of the processes shown may be performed contemporaneously.

At step 402, of process 400, performance assessment databases and sources are identified. At block 404, raw performance/training data (sometimes referred to as "assessment source data") for a trainee (i.e., individual or team) or worker(s) (i.e., medical person, athlete or team) is organized. The term trainee, athlete, worker or employee may sometimes be used interchangeably herein for brevity. At block 406, performance source data including the text files are transferred to the NLP engine 116 as will be described in relation to FIG. 4B.

Figure 7C:
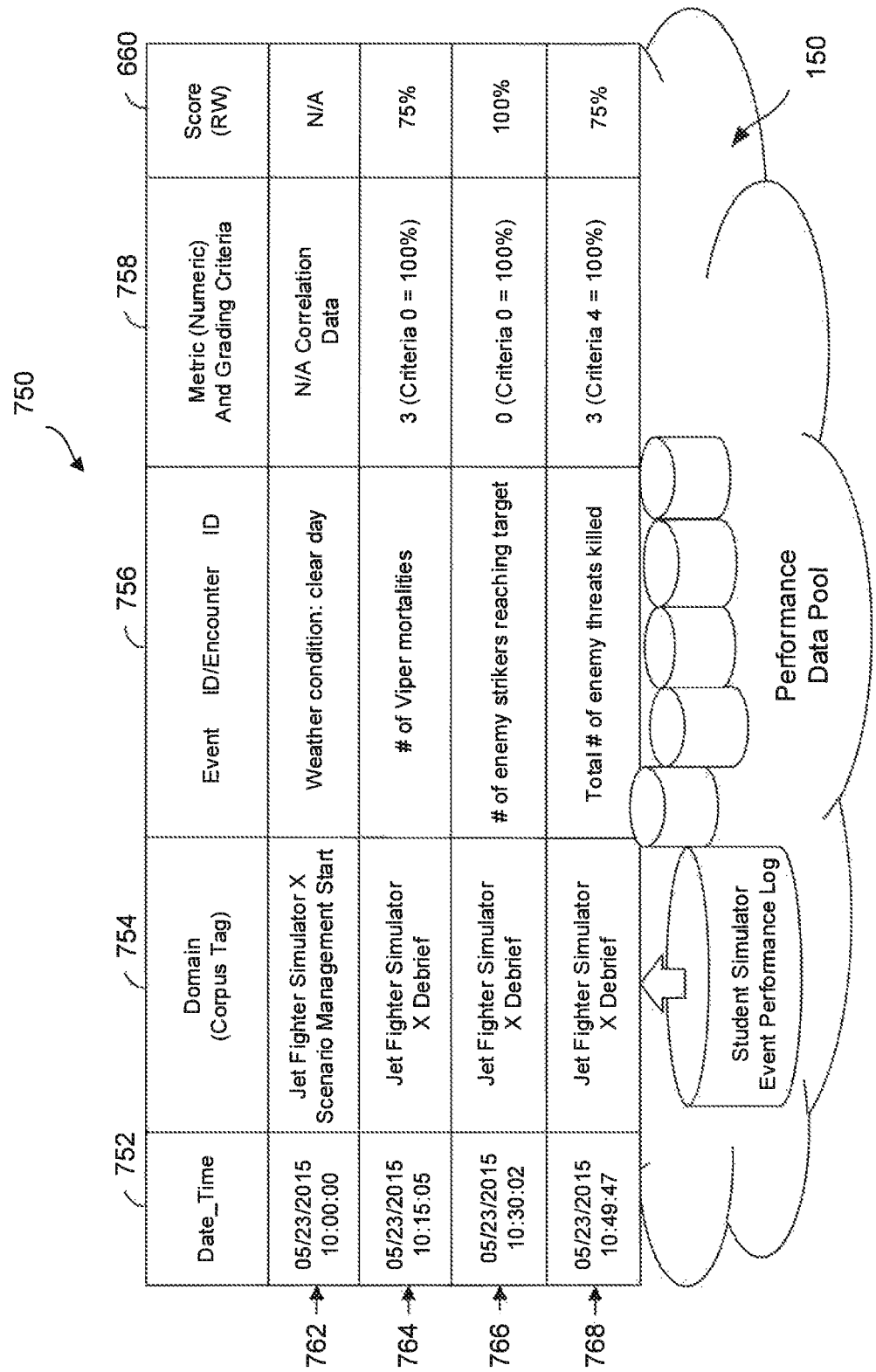
FIG. 7C illustrates a performance assessment report based on the unstructured text search model FIG. 7B.
Figure 8C:
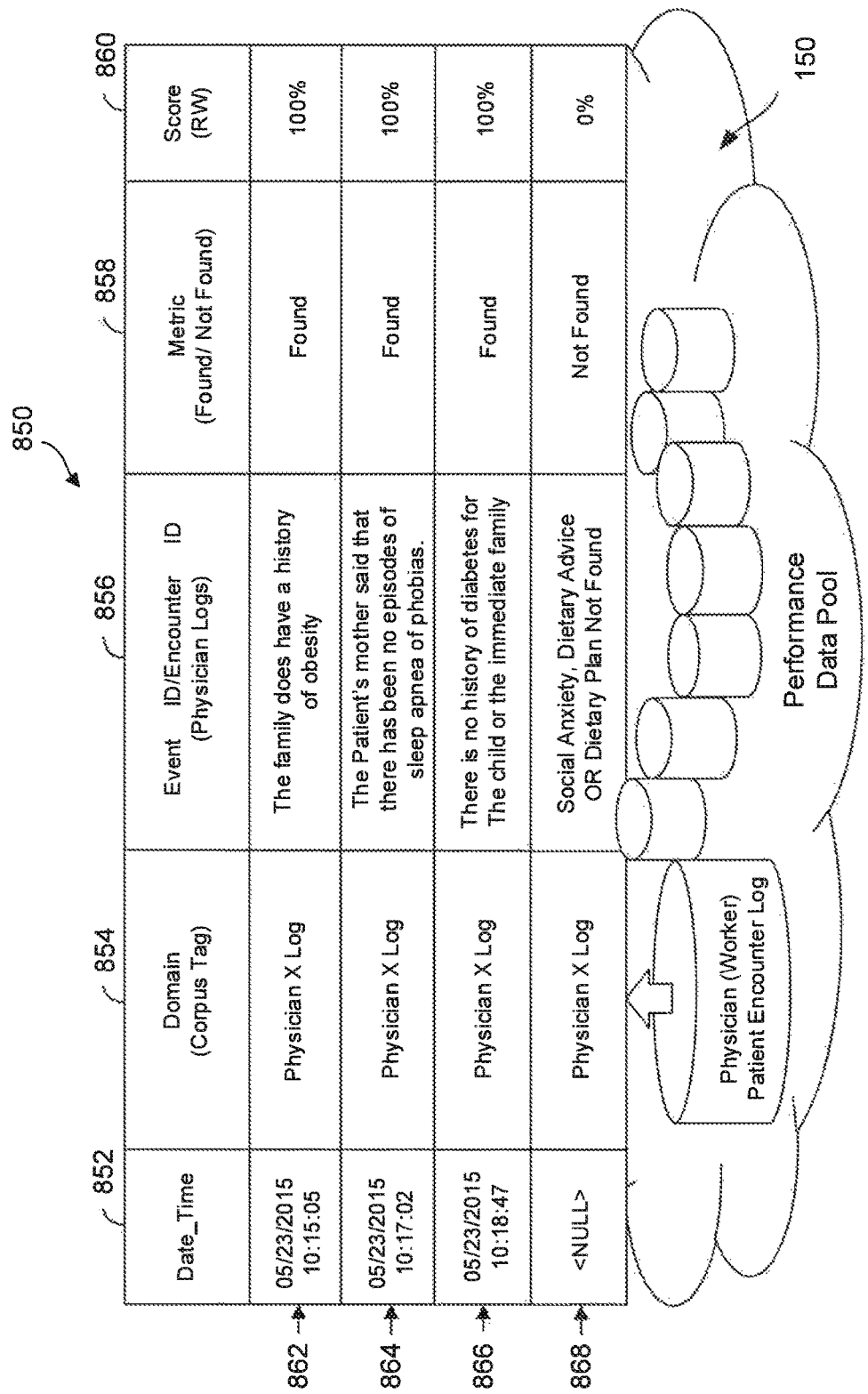
FIG. 8C illustrates a gap assessment report based on the unstructured text search model FIG. 8B.

The performance source data may include performance data-to-text files. The performance data-to-text files may include performance scores, progression, self-notes or $3^{rd}$ party notes, biometric readings, etc. At block 408, a subject matter expert (SME) creates scoring criteria (primary and secondary terms). These terms may include a list of words. The scoring criteria may include training event data which may include training objectives for a training event or training session. Scoring criteria may be performance assessment criteria. For example, a trainee may be required to perform enemy target detection during a training event or session. Database 485 includes an assessment domain ontology (ADO) that documents the relationships between learning objectives and assessment criteria rules. The domain ontology, learning objectives and assessment criteria rules are established as part of the performance assessment guidelines wherein each training event or session is configured to impart to the trainee learning objectives as searchable words and terms. The learning objective may include assessment criteria rules to score and evaluate whether the learning objectives are achieved during a training event or session wherein assessment goal or goals in the training session or job may be determined to be completed. By way of non-limiting example, the metric and grading criteria in FIGS. 6C and 7C is an example of a scoring criteria, such as, for performance assessments. In FIG. 8C, the scoring criteria having a metric of found or not found is an example of a gap assessment. The embodiments herein are configurable to conduct on-demand a performance or gap assessments with natural language.

The learning objective may be a performance objective wherein when assessing training, the learning objective may represent a learned skill to be taught by the training system or course. However, for an employee, evaluating whether the employee performs there job is a performance objective. The performance requirements may include performance events that are assessed for compliance with a performance criteria, contract obligation, a checklist, etc.

ADO database 485 may include and store assessment domain ontology (ADO), learning objectives, KSA, interventions and assessment criteria rules (ACR). The data from ADO database 485 is feed (sent to or retrieved) to block 408 for use by the SME, employer or trainer (i.e., trainer 230). SME may describe task requirements from interview transcripts. The SME transcripts may be used to create an ontology expressed in the ADO. Additionally, in some embodiments, detail job duties may be used for human performance assessments. The detail job duties may be used to create the ontology.

The process 400 may transfer (1) "Text Files collected" at block 406 and/or (2) "SME Scoring Criteria Primary and/or Secondary Terms" at block 408 to process 420. The SME Scoring Criteria Primary and/or Secondary Terms may be an ontology for at least one domain.

FIG. 4B illustrates a flow diagram of a process 420 for natural language processing (NLP) of the structured and unstructured performance data. The process 420 is carried out by NLP engine 116 of FIG. 1B. At block 422, the NLP processing steps include parse and tokenize source inputs (corpus) from the process 400. By way of non-limiting example, tokenize may include acts of dividing a string of words into keywords, key terms or text string patterns (defined in an ontology). In general, tokenization is a way to split text from the HTPK system 150 into tokens. These tokens could be paragraphs, sentences, phrases or individual words.

At block 424, assessment topics are auto extracted from the tokenized performance source data. At block 426, per "topic," the criteria primary terms are found or identified in the tokenized performance source data by the NLP engine 116. The term "topic" is part of the unstructured search model described in detail in FIGS. 6B, 7B and 8B. At block 428, per "topic," the secondary terms or context terms are identified in the tokenized performance source data by the NLP engine 116. At block 430, for all primary and second terms, synonyms and subcategories are identified in the tokenized performance source data by the NLP engine 116. At block 432, the assessment search terms are stored and formatted for the unstructured search model described in detail in FIGS. 6B, 7B and 8B.

When searching for primary and secondary terms synonyms and subcategories are searched for in the files. For example, a SME might say "student checks for automobile mileage". The system may also check for "car mileage" although "car" was never explicitly mentioned. This may be accomplished by having the assessment domain ontology (ADO) database contain dictionary, glossary or thesaurus source information and functions to expand the word or phrase list to include synonyms.

Thus, the files of the performance source data are searched for one or more of the synonyms. In an embodiment, the files of the performance source data are searched for all of the synonyms.

FIG. 4C illustrates a flow diagram of a process 440 for semantic reasoner rules. The process 440 may be performed by the semantic reasoner module 117 of FIG. 1B. At block 442, historical data is stored. The historical data may include one or more of trainee records, performance records, personnel records, prior gap assessment data and prior performance assessment data. At block 444, the system accepts and processes performance questions. For example, a performance question may include "Did the student pilot engage enemy targets effectively?" In some embodiments, a performance question may ask, by way of non-limiting example, for failures, lack of certain performance objectives, prior scores below a particular threshold, and outdated performance or training. At block 446, assessment "topics" are extracted from the query and current and historical data correlations are searched. For example, the search may seek to identify if the trainee failed training in the past. If there was a failure, a determination of the reason for the failure may be identified. A query may include whether failures for the same reason have occurred. At block 448, performance scores and gaps are identified. By way of non-limiting example, performance gaps may be identified by determining things the student/worker should have done but did not. At block 450, rules are applied to calculate performance predictions, corrective actions and recommend specific interventions from the ADO database 485. If assessment scoring criteria was included in the assessment domain ontology (ADO) in the ADO database 485 for the primary terms associated with the assessment topics, then a new score will be calculated. The assessment criteria rules 199 includes the assessment scoring criteria.

FIG. 4D illustrates a flow diagram of a process 460 for assessment report generation. The process 460 may be performed by the student/worker performance data organization module 120. Examples, of a performance assessment report 650, 750 or 850 of FIGS. 6C, 7C and 8C are shown. At block 462, one or more of scoring, tallying, summing and averaging may be performed. Performance or training gaps may be recorded. Cause and effect correlations may be determined. Timestamps may be added.

At block 464, a comprehensive performance or gap assessment reports may be generated. At block 466, enhanced after action review (AAR) may be conducted or performance evaluation. At block 468, the output formats for the report may be feed to block 466 such that the report format may be customized and may be fed to block 464 to provide report templates. From block 464, the data associated with the (gap or performance) assessment report may also be feedback to the HPTK system 150 wherein the data may be used as part of the historical data.

Performance data fusion of current and historical data may be performed using semantic technology. Performance and remediation terms are combined in a rule-based system using semantic mapping technology.

The processes 400, 420, 440 and 460 collectively may be configured, in an embodiment, to apply the SME transcript-based ontology to logs and transcripts of training sessions/events to identify and score on-demand the presence of declarative knowledge. The processes 400, 420, 440 and 460 collectively may be configured, in an embodiment, to apply the SME transcript-based ontology to logs and transcripts of training sessions/events to evaluate methods and process sequences used in decision making for comparison against a SME sequence for a corresponding training session/event.

The processes 400, 420, 440 and 460 collectively may be configured, in an embodiment to evaluate one or more of gaps in training, performance gaps in worker operations, post-training requirements, and ongoing readiness. Ongoing readiness may be evaluated for first responders, military, law enforcement and other teams.

The assessment domain ontology (ADO) provides a representation of the data and the relationships and mappings between the learning objectives and Primary and Secondary Words/Terms. By way of non-limiting example, the assessment domain ontology (ADO) may be expressed in Manchester syntax. The Manchester syntax is a compact syntax for Web Ontology Language (OWL). A structured representation of the ontology-based mapping may include the following information illustrated for a particular learning objective topic named "Target Detection":
    Class: SkillObjective, . . .
    ObjectProperty: hasMaxDetectionTime
        Annotation: "Assessment Criteria in minutes"
        Range: Decimal, . . .
        SubPropertyOf: Score
    ObjectProperty: hasAccomplishedTask
        Range: Found, NotFound
        SubPropertyOf: Score
    DataProperty: hasPrimaryTerm
        Range: String, . . .
    DataProperty: hasPrimarySynonym
        Range: String, . . .
    DataProperty: hasSecondaryTerm
        Range: String, . . .
    DataProperty: hasSecondarySynonym
        Range: String, . . .
    Individual: TargetDetection
        Types: SkillObjective
        Facts: hasMaxDetectionTime value10, . . .
            hasPrimaryTerm "target detection"
                hasSecondaryTerm "detection time"
                hasSecondarySynonym "time to detect"
                hasSecondaryTerm "acquisition time"
                hasSecondarySynonym "AQT"
                hasSecondaryTerm "minutes"
                hasSecondarySynonym "min"
            hasPrimaryTerm "eye exam"
                hasPrimarySynonym "vision test"
                hasSecondaryTerm "eyesight"
                hasSecondarySynonym "eye sight"
                hasSecondaryTerm "prescription"
    . . .

Primary and secondary words/terms and assessment criteria may be stored in a common assessment domain ontology (ADO) database 185. Domain may include for a training exercise a recognized learning objective that is mapped to the stored words and terms. The domain may include a plurality of topics. For on-the-job activities, the domain may include a job function detail. The assessment domain ontology (ADO) database 185 may use an ontology-based mapping. "Ontology-based mapping" may be defined as the mapping of salient (most prominent and important) secondary terms with respect to a target word (primary term).

Each topic may include at least one primary word or primary word phrase. For example, a primary phrase or words may be "target detection". Each topic and/or primary phrase or primary word may include one or more secondary words wherein secondary words may be derived from a Taxonomy, Dictionary and/or Thesaurus word/term lists. The secondary words may include reserved words, synonyms, acronyms or abbreviations of one or more reserved words. Reserved words may include domain-specific units, domain-specific grades, domain-specific score, and domain-specific percentiles.

Searching for a distinct primary term may be correlated with a set of possible secondary terms (i.e. "Minutes" plus some numerical value or Reserved Words).

During the process 420 there may be an initial parsing and tokenization. By way of non-limiting example, the HPA system 170 may be configured to parse and search the identified performance assessment textual source(s) to: 1) enumerate and/or print an entire sentence with a Sentence ID; 2) write sentences to a separate log file with a reference log number; 3) maintain the sentence IDs for later use. The sentences may be printed and stored by sentence ID.

By way of non-limiting example, the HPA system 170 may be configured to perform part-of-speech tagging; extract and record a primary word/term occurrence found in a sentence correlated with a sentence ID.

The HPA system 170 may not distinguish between lower and upper case letters during word searches; the system may process all words/terms internally as lower case.

By way of non-limiting example, the HPA system 170 may be configured to extract and record corresponding secondary word(s) identified. Secondary words/terms may be extracted and recorded without a primary word/term. Additionally, numerical values and units may be extracted and recorded when identified in the same sentence where a primary word/term was identified. Furthermore, reserved words may be extracted and recorded when identified in the same sentence (sentence ID) where the primary word/term was identified.

By way of non-limiting example, the HPA system 179 may print the sentences or sentence parts that have one or more of primary word and secondary words in the assessment report. In some embodiments, the primary words and secondary words may be visually enhanced to identify a "matched" condition. By way of non-limiting example, the primary words and secondary words may be at least one of bolded, colored, and italicized, when printed or displayed on a display device as part of the report.

By way of non-limiting example, the HPA system 170 may be configured to extract and record numerical values identified in the search of the text. The HPA system 170 may be configured to extract and record reserve words found such as the units and the context thereof such as sentence ID. The HPA system 170 may be configured to extract and record a numerical value identified (e.g., 15 millimeters). The HPA system 170 may be configured to extract and record a numerical value identified in in words (e.g., "one hundred" instead of 100). The HPA system 170 may be configured to extract and record a synonyms and subcategories (according to a taxonomical ontology) for at least one of the primary words, secondary words, and reserved words within the assessment domain ontology (ADO) database The HPA system 170 may be configured to display or print the sentences that have the numerical value in the assessment report. The HPA system 170 may be configured to record the total number of times (tally) the primary word was found (or not found). The HPA system 170 may be configured to record the total number of times (tally) the primary word was found with the secondary words (or without the secondary words). These tallies may be created for the whole document(s) or files of a training event and per assessment category or topic. The tallies may be restarted per different training system or event. Total tallies may be created for all training events or systems. The HPA system 170 may be configured to tally performance events associated with job activities or performance activities.

The HPA system 170 may be configured to re-run the parse-search using primary word synonyms, acronyms, word-stems and hyphenated words. The synonyms and acronyms may be created before the first search of the primary word is conducted and subsequently expanded after each search synonyms and acronyms.

Figure 5A:
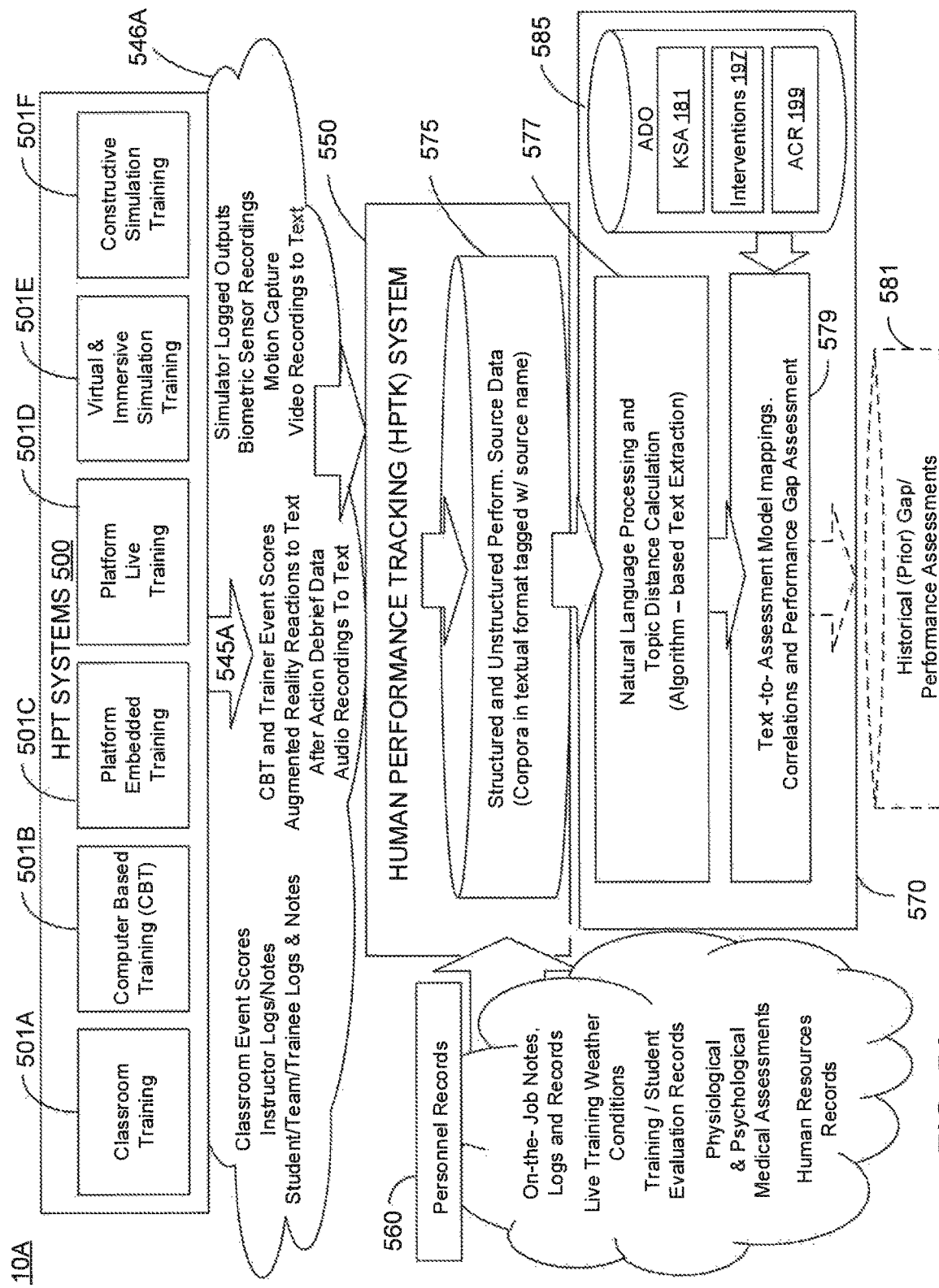
FIG. 5A illustrates a flow diagram implementation of a human performance training, tracking and assessment system.

FIG. 5A illustrates a flow diagram implementation of a human performance training, tracking and assessment (HPTTA) system 10A. The HPTTA system comprises HPT systems 500 which produce TED outputs 545A which may include FFED for a training session/event.

The HPT systems 500 may comprise one or more of classroom training system 501A, computer based training (CBT) system 501B, platform embedded training system 501C, platform live training system 501D, virtual and immersive simulation training system 501E, and constructive simulation training system 501F.

By way of non-limiting example, the TED outputs 545A are tracked by HPTK system 550 and stored as data, such as in a cloud 546A. The cloud 546A may be part of HPTK system 550 or independent. However, data from the cloud 546A is tagged and timestamped and may include a source name. The TED outputs 545A may include classroom event scores data, CBT and trainer event scores data, simulator logged outputs data, instructor logs/notes data, augmented reality reaction-to-text data, biometric sensor recordings data, student/team/trainee logs and notes data, after action review (AAR) and debrief data, motion capture/video recordings-to-text data and/or audio recordings-to-text data. The TED outputs 545A may be stored in memory. The TED outputs 545A are stored and associated with a trainee or worker. The TED outputs 545A may be timestamped. The timestamp may include the date the training event took place. Some of the TED outputs 545A may be stored as structured textual performance source data.

The HPT systems 500 may produce various sources of training data from disparate training sources of HPT systems 500.

Performance source data may be derived from personnel records 560 or historical records. Personnel records 560 or historical records may include one or more of on-the-job notes, logs and records; live training weather conditions; training/student evaluation records; physiological and psychological medical assessments; and human resources records.

The HPA system 570 is represented in blocks 577, 579 and 585. The structured and unstructured performance source data (also named corpora) is stored in one or more databases or memory devices represented at database 575 in HPTK system 550 (i.e., HPTK system 150). In linguistics, corpora is the plural of corpus or text corpus which is a large collection of writings or set of texts. The personnel records 560 or historical records are stored as unstructured performance source data at database 575 of the HPTK system 550.

The unstructured performance source data is processed by a natural language processing engine 116 at block 577. The natural language processing (NLP) engine 116 at block 577 may determine topic distance calculations (TDC). The TDC may include results from one or more techniques to extract and represent the contextual-usage meaning of words by statistical computations applied to a large corpus of text. These methods can be, and not limited to, Latent Semantic Analysis (LSA), Latent Dirichlet Allocation (LDA), and singular value decomposition (SVD) calculations. The natural language processing engine 116 at block 577 may use this algorithm-based text extraction to generate a relevant subset (for narrowing down) of performance documentation that include assessment domain data in the assessment domain ontology (ADO) database 585 (i.e., ADO database 185) wherein domain may be a function of an industry, industry standards, job standards, training standards, and sport type. The database 585 may include ontology for learning objectives, KSA parameters and/or identifiers 181, interventions 197 and/or assessment criteria rules (ACR) 199.

The results from the NLP engine 116 at block 577 are feed into text-to-assessment model mapper 579. The text-to-assessment model mapper 579 may perform correlations for the performance or gap assessments. The assessment domain ontology database 585 may include ontology, taxonomy, dictionary and thesaurus mappings which are accessed by the NLP engine 116 at block 577. The assessment domain ontology (ADO) database contains key terms that are required in the assessment criteria. The text-to-assessment model mapper 579 may also receive knowledge, skills and attitude (KSA) parameters and identifiers 181. The KSA parameters provide key terms that can also be used by the NLP engine for assessment criteria and goal searches. The text-to-assessment model mapper 579 correlates to acts of the semantic reasoner module 117, such as described in relation to FIG. 4C.

In addition to generating and outputting a gap assessment report or performance assessment report, the HPA system 570 may send the feedback data to database 581 which is part of HPTK system 550. The database 581 may store historical (prior) gap assessments or performance (prior) assessments.

Figure 5B:
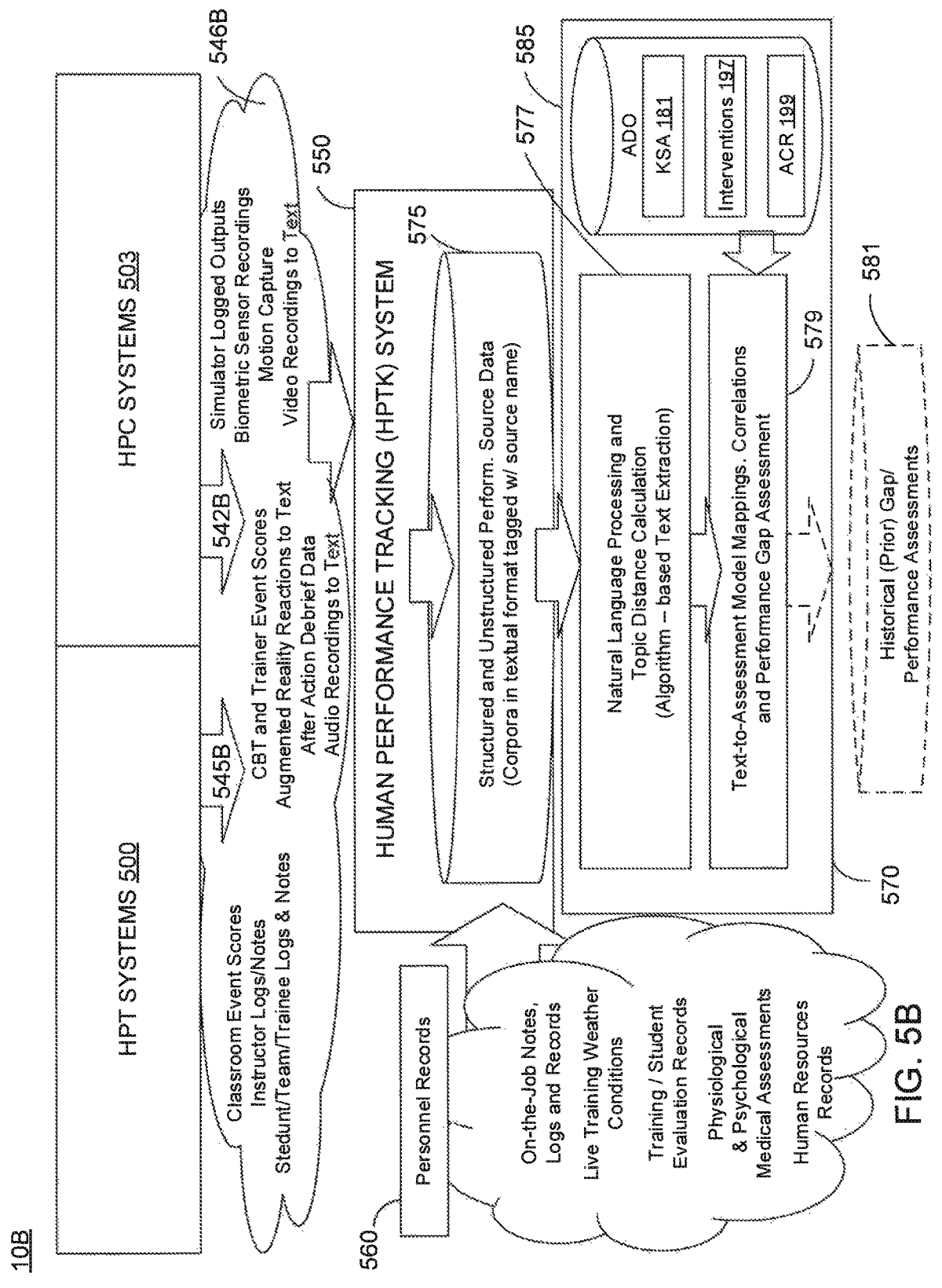

FIG. 5B illustrates a flow diagram of a human performance capture, tracking and assessment (HPCTA) system 10B. In an embodiment, the human performance capture, tracking and assessment (HPCTA) system 10B is similar to the HPTTA system 10A. Therefore, only the differences will be described for the sake of brevity. The HPCTA system 10B includes at least one human performance capture (HPC) systems 503. The HPC system 503 is configured to capture human performance such as on-the-job activities or other performance activities and generate unstructured performance data at output 542B. At least one HPC system 503 may produce outputs 542B relating to captured job performance. The HPTK system 550 may store and track source data representative of the captured job or mission performance. The HPTK system 550 may store and track source data representative of the sports performance, athletic performance or physical performance. The HPT systems 500 produces output 545B which may be stored with outputs 542B in memory or cloud 546B.

By way of non-limiting example, in one embodiment, when the individual is a skilled professional. In some embodiments, the profession may require continual training to maintain a certain skill level. Therefore, as the individual is periodically trained, the performance source data is updated. Furthermore, the human performance capture (HPC) systems 503 may capture job performance to determine an employee's performance on the job. The job performance capture data is tracked by the HPTK system 550 for use in HPA system 570 to conduct assessments and/or gap assessments.

Figure 5C:
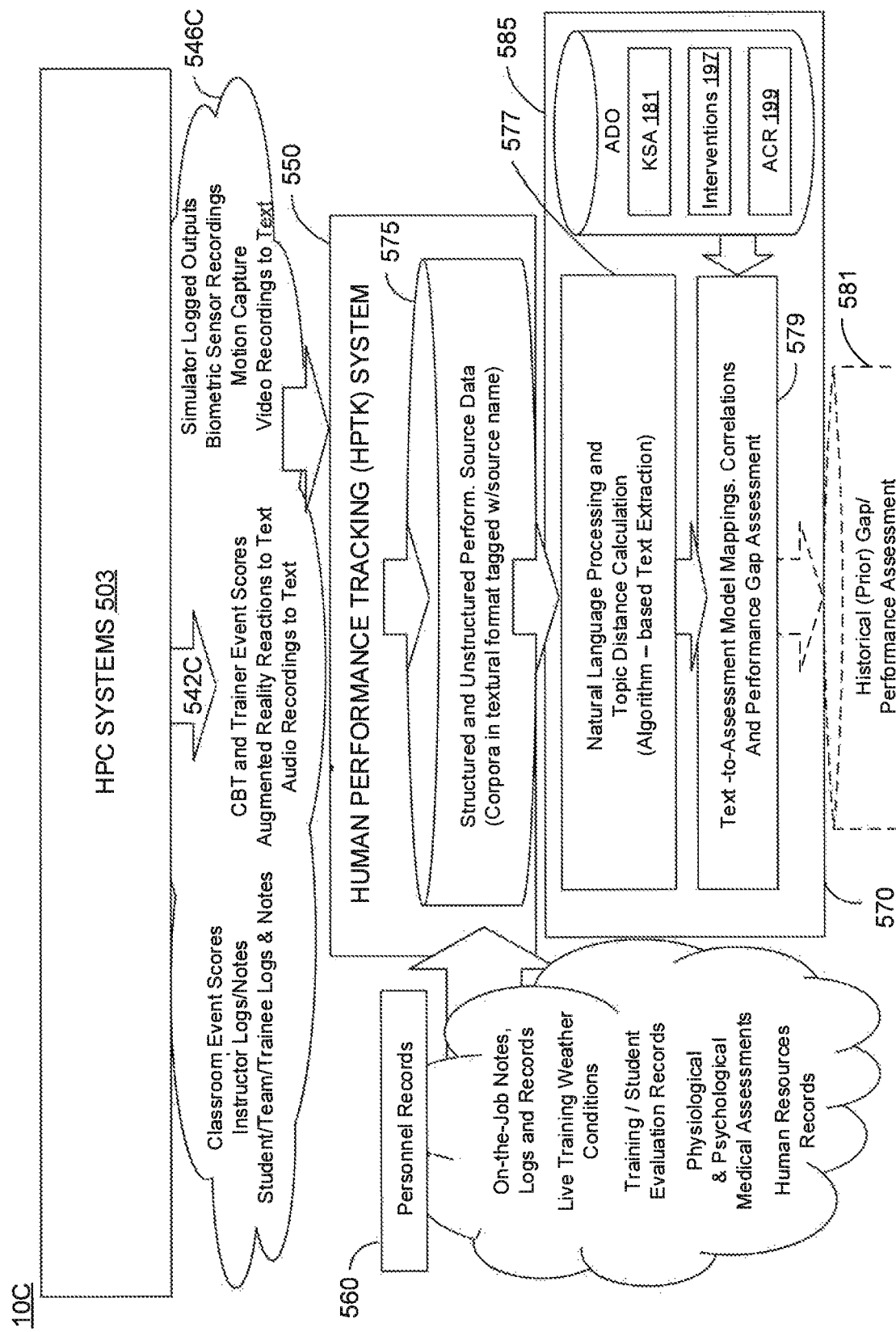
FIG. 5C illustrates a flow diagram of a human performance, capture, tracking and assessment system.

FIG. 5C illustrates a flow diagram of a human performance, capture, tracking and assessment system 10C. In some embodiment, the HPT systems 500 may be omitted. In this embodiment, only the differences will be described.

Here, the system 10C uses human performance capture (HPC) systems 503 to capture performance (unstructured performance source data) generate output 542C for storage in memory or cloud 546C.

For example, the job performance captured data may be used for promoting an employee as their on-the-job activities are evaluated including free-form unstructured data. In an embodiment, the job performance captured data may identify whether an employee or team are meeting contractual obligations. In an embodiment, the job performance captured data compared to the KSA parameters may identify whether an employee needs training to improve on their job performance. In some embodiments, the HPT system 500 is separate from the human performance capture (HPC) systems 503.

Examples of performance or gap assessments will now be described in more detail.

Example 1

Example 1 is directed to military training environment wherein the trainee is a soldier. By way of non-limiting example, the trainee (i.e., trainee 205) may have performed training through a plurality of HPT systems (i.e., HPT systems 100A, 100B or 100C). The training system may include one or more of live training system (i.e., live training system 501D), full mission simulation training (i.e., virtual and immersive simulation training system 501E), and desktop simulator training (i.e., CBT system 501B) over time. The structured and unstructured training performance source data is stored and tracked by a HPTK system 150.

FIG. 6A illustrates a user query for a performance assessment entered using the user query interface 502 (FIG. 5) of the HPA system 170. The user query interface 502 allows the user to enter an assessment question or statement related to the trainee. For example, an assessment query (AQ) may be "How many times has Student X ever failed target detection criteria?" represented in block 608. The AQ text is parsed against the assessment domain ontology (ADO) primary and secondary words/terms to determine the learning objectives associated with the query. The AQ includes a trainee identifier, a particular skill or learning object, and a query assessment criteria. In this example, the particular skill or training objective is "target detection". The trainee identifier of the AQ is "Student X". The query assessment criteria of the AQ in the example is "failed." The query assessment criteria of the AQ may alternately be "passed."

FIG. 6B illustrates an unstructured search model 610 based on the user query of FIG. 6A. The HPA system 170 generates an unstructured search model (i.e., unstructured search model 610). By way of non-limiting example, the unstructured search model 610 includes a plurality of data fields for entering or populating a search model. For example, the search model 610 may include a plurality of columns 612, 614, 616 and 618. Specifically, the columns include Topic column 612, Primary (P) Word/Term column 614, Apply Secondary (S) Words/Terms (or Semantic Distance Calculation) column 616, and Temporal Constraint column 618. The search model may be created based on the user query of FIG. 6A and based on the assessment criteria rules (ACR) in the ADO database 185.

By way of non-limiting example, the unstructured search model 610 includes one or more rows 620 or data fields. In this example, the row 620 includes entry of the text "Target Detection" in the field corresponding to the Topic column 612. Thus, the Primary (P) Word/Term column 614 includes at least one primary word (text) such as "Target Detection"

for an assessed skill or learning objective. The data entry field in row 620 corresponding to column 616 (i.e., Secondary (S) Words/Terms (or Semantic Distance Calculation) includes the secondary words (text) such as without limitation Time-to-Detect Time (or Detection Time); and Acquisition Time. As documented in the assessment domain ontology (ADO) database, the terms Time-to-Detect, Acquisition Time, and Detection Time may be variations or secondary words/terms of the primary term Target Detection. Furthermore, the data entry field in row 620 includes additional search terms such as for Eye Exam (OR Eye Sight); and a time parameter for such detection such as without limitation Minutes (OR Seconds).

The secondary terms may be separated by "OR" statements. "OR" statements may in dictate synonyms. Suborder is for taxonomical relationships where suborders are a lower ranking subcategories of a taxonomical term.

The data entry field in row 620 corresponding to column 618 includes a temporal constraint corresponding to 0 to present. The temporal constraint may be a range such as 0 to present which searches for the performance source data within the range. The value 0 may include the start of any performance source data or in other words from the beginning of stored records. Oher temporal constraints may be used to define a data range or time period.

FIG. 6C illustrates a performance assessment report 650 based on the unstructured search model 610 of FIG. 6B. The performance assessment report 650 may include a plurality of columns such as Date_Time column 652, Domain (Corpus Tag) column 654, Event ID/Encountered ID column 656, Metric (Numeric) and Grading Criteria column 658, and Score column 660. Each row 662, 664, 666, and 668 of the report 650 includes a field corresponding to the columns, the field being populated with the information matched in the performance source data.

In column 654, at row 662, the field is populated with assessment domain type corresponding to live training (such as from live training system 501D). At row 666, the field is populated with the assessment domain type corresponding to full mission simulation training (such as from virtual and immersive simulation training system 501E). At row 668, the field is populated with the domain type corresponding to desktop simulator training (such as from virtual and immersive simulation training system 501B). In this example, at column 656, at row 662, historical records for the eye exam has been also searched. In row 664, the field of column 654 is populated with the assessment domain type of medical (such as from personnel records).

Medical information, when evaluating certain learning objectives or skills, may be helpful such as when identifying causes of certain performance scores. By way of non-limiting example, a trainee may have failed a learning objective for target detection which was later passed after the trainee had vision correction. Therefore, when performing performance assessments, in some instances, the trainee's personnel health and/or conditioning may be part of the search model.

The populated data in the Date_Time column 652 is in data order with the most recent date presented in row 662, the first row. In files in column 652 may include both a date and a time.

By way of non-limiting example, training events have an event ID. In column 656, an event ID may be paired with an encounter of the learning objective in terms of the primary terms or secondary terms. In column 656, row 662, the corresponding field is populated with Live 1XA which corresponds to the event ID. The event ID is paired with a learning objective (encounter ID) described as panel average target detection time. In row 666, the event ID is Tank Simulator 1XA and the learning objective (encounter ID) is target detection time. In row 668, the event ID is Tank Simulator 1YB and the learning objective (encounter ID) is target acquisition time. In row 664, the field is populated with "eye exam" corresponding to a searched term of the model. In this instance, an event ID is not provided as an eye exam in part of a training event.

In column, 658, the grading criteria is provided. For example, the grading criteria may be 1 minute or less equal 100%. There may be other criteria based on the learning objectives stored in the assessment domain ontology (ADO) and the assessment criteria rules (ACR). Column 658 also include a time parameter, such as 10 minutes in row 662, 5 minutes in row 666; and 2 minutes in row 668. In row 664, since an eye exam is not a training event with a measured performance, the field in column 658 may be populated with N/A correlation data or other language indicating that there the entry does not have a corresponding grading criteria.

Column 660 represents the score provided to the event. By way of non-limiting example, in row 662, the score is 68%, row 666, 85% and row 668, 91%. In row 664, the field in column 660 is populated with N/A as the eye exam does not have a corresponding score. The score populated in each row of column 660 may be created based on scoring performed at bock 462 of FIG. 4D.

Example 2

Example 2 is directed to military training environment wherein the trainee is a pilot. By way of non-limiting example, the trainee (i.e., trainee 205) may have performed training through a plurality of HPT systems (i.e., HPT systems 100A, 100B or 100C). The training may include Jet Fighter Simulator system. The structured and unstructured training assessment source data is stored and tracked by a HPTK system 150. The performance assessment report may be used for an after action report (AAR) debrief for a training session conducted today. The AAR debrief can provide the trainee information regarding their performance using not just structured source data but unstructured source data. Furthermore, structured source data may be correlated with unstructured source data.

FIG. 7A illustrates an assessment query 708 for a performance assessment entered using the user query interface 502 (FIG. 5) of the HPA system 170. The assessment query (AQ) 708 may include "Did the student pilot engage enemy targets effectively?" The AQ text is parsed against the assessment domain ontology (ADO) primary and secondary words/terms to determine the learning objectives associated with the query. The AQ includes a trainee identifier, a particular skill or learning object, and a query assessment criteria. In this example, the particular skill or training objective is "enemy". The trainee identifier of the AQ is "Student". The query assessment criteria of the AQ in the example is "engaged."

FIG. 7B illustrates an unstructured search model based on the assessment query of FIG. 7A. The HPA system 170 generates an unstructured search model (i.e., unstructured search model 710). By way of non-limiting example, the unstructured search model 710 includes a plurality of columns 712, 714, 716 and 718. Specifically, the columns include Topic column 712, Primary (P) Word/Term column 614, Apply Secondary (S) Words/Terms (or Semantic Distance Calculation) column 716, and Temporal Constraint column 718.

By way of non-limiting example, the unstructured search model 710 includes one or more rows 720 with data entry fields. In this example, the row 720 includes "DMO Target Engagement" in the data entry field corresponding to the Topic column 712. The Primary (P) Word/Term column 714 includes at least one primary word including "Enemy" or "Target" or "Viper" for an assessed skill or learning objective. Each of the words "Enemy," "Target" and "Viper" may be representative of the same learning objective or skill for a pilot in training.

The data entry field in row 720 corresponding to column 716 (i.e., Secondary (S) Words/Terms (or Semantic Distance Calculation) includes the secondary words such as without limitation killed, number of targets killed, total killed, and number reaching target. The secondary terms may include other terms such as weather condition to assess performance under a specified condition such as a weather condition. Other constraints may include time of day as an example such as dusk, dawn, daylight, and night.

The secondary terms may be separated by "OR" statements. "OR" statements may indicate synonyms. Suborder is for taxonomical relationships where suborders are a lower ranking subcategories of a taxonomical term.

The data entry field in row 720 corresponding to column 718 includes a temporal constraint corresponding to Today. The temporal constraint searches for the assessment source data within the range. The value Today may include starting the search of any assessment source data for the current day stored records.

FIG. 7C illustrates a performance assessment report based on the unstructured search model FIG. 7B. The performance assessment report 750 includes a plurality of columns such as Date_Time column 752, Domain (Corpus Tag) column 754, Event ID/Encountered ID column 756, Metric (Numeric) and Grading Criteria column 758, and Score column 760. Each row 762, 764, 766, and 768 of the report 750 includes a field corresponding to the columns, the field being populated with the information matched in the assessment source data.

The Date_Time column 752 includes a date entries for the same day. The difference is a function of time based on the time of the event ID matching the search model 710. In the example, all fields of the domain column 754 related to various training events of Jet Fighter Simulator X. In row 762, the domain is Jet Fighter Simulator X, scenario management start. In rows 764, 766 and 768, the domain is Jet Fighter Simulator X debrief.

In column 756, row 762, the event ID/encounter ID corresponds to the weather condition such as clear day. In column 756, row 764, the number of viper mortalities is a learning objective (encounter ID). In column 756, row 766, the number of enemy targets reaching target is a learning objective (encounter ID). In column 756, row 768, the total number of enemy threats killed is a learning objective (encounter ID).

In column 758, the metric and grading cratering includes for row 764, 3 (Criteria 0=100%). In row 766, the field for column 758 is populated with 0 (Criteria 0=100%). In row 768 of column 758, the field is populated with 3 (Criteria 0=100%).

Column 760 represents the score provided to the events. By way of non-limiting example, in row 762, the score is N/A, row 764, 75% and row 766, 100%; and row 768, 75%.

Example 3

Example 3 relates to a medical professional such without limitation a pediatric physician. The assessment query and performance assessment does not require the assessment source data to come from training systems. The assessment source data may come from hardcopy forms or electronic forms where information may be scanned and converted into a text format. By way of non-limiting example, a text of a scanned hardcopy of a document may be extracted using optical character recognition (OCR).

Nonetheless, assessment data may come from a training system in combination with hardcopy notes, logs or patient forms.

FIG. 8A illustrates an assessment query for a performance assessment entered using the user query interface 502 (FIG. 5) of the HPA system 170. The assessment query (AQ) 808 may include "Did the physician investigate the patient's Obesity Condition effectively?" The AQ text is parsed against the assessment domain ontology (ADO) primary and secondary words/terms to determine the learning objectives associated with the query. The AQ includes a trainee identifier, a particular skill or learning object, and a query assessment criteria. In this example, the particular skill or training objective is "obesity". The trainee identifier of the AQ is "physician". The query assessment criteria of the AQ in the example is "investigate."

FIG. 8B illustrates an unstructured search model 810 based on the assessment query 808 of FIG. 8A. The HPA system 170 generates an unstructured search model (i.e., unstructured search model 810). By way of non-limiting example, the unstructured search model 810 includes a plurality of columns 812, 814, 816 and 818. Specifically, the columns include Topic column 812, Primary (P) Word/Term column 814, Apply Secondary (S) Words/Terms (or Semantic Distance Calculation) column 816, and Temporal Constraint column 818.

By way of non-limiting example, the unstructured search model 710 includes one or more rows 820. In this example, the row 820 includes "Obesity" in the data entry field corresponding to the Topic column 812. The Primary (P) Word/Term column 814 includes at least one primary word including "BMI greater than $95^{th}$ percentile" for an assessed skill or learning objective.

The data entry field in row 820 corresponding to column 816 (i.e., Secondary (S) Words/Terms (or Semantic Distance Calculation) includes the secondary words such as without limitation family; history; social anxiety; phobias; sleep disorder (SUBORDER Sleep apnea); diabetes; dietary advise (OR dietary plan).

The secondary terms may be separated by "OR" statements. "OR" statements may indicate synonyms. Suborder is used for taxonomical relationships.

The data entry field in row 820 corresponding to column 818 includes a temporal constraint corresponding to within the last 3 months. The temporal constraint searches for the assessment source data within the range. The value last 3 months may include starting the search of any assessment source data for the current day and each day for the past 3 months of stored records.

FIG. 8C illustrates a gap assessment report 850 based on the unstructured search model 810 of FIG. 8B. The gap assessment report 850 includes a plurality of columns such as Date_Time column 852, Domain (Corpus Tag) column 854, Event ID/Encountered ID column 856, Metric (Found/Not Found) column 858, and Score column 860. Each row 862, 864, 866, and 868 of the report 850 includes a field corresponding to the columns, the fields being populated with the information matched in the assessment source data. In the example, the metric Found/Not Found) is an example of a gap assessment. Other types of gap assessments can be generated such as pass/fail, by way of example.

In this example, the Date_Time column 852, includes the date and time in a physician log for rows 862, 864 and 866. In row 868, a null entry has been populated in column 852 meaning no date and time were attainable. In the Domain (Corpus Tag) column 854, the domain for each entry of rows 862, 864, 866, and 868 is for a physician log.

Event ID/Encountered ID column 856, populates the field of rows 862, 864, 866, and 868 with the performance objective. In row 862, the physician log indicated that the family does have a history of obesity. The Metric (Found/Not Found) column 858 indicates that primary/secondary terms were found. The Score column 860 included 100% score calculated from the metric Found/Not Found outcome.

In row 864, the physician log indicated that the patient's mother said that there has been two episodes of sleep apnea or phobias. The Metric (Found/Not Found) column 858 indicates that primary/secondary terms were found. The Score column 860 included 100% score.

In row 866, the physician log indicated that there is no history of diabetes for the child or immediate family. The Metric (Found/Not Found) column 858 indicates that primary/secondary terms were found. The Score column 860 included 100% computed score.

In row 868, the events associated with social anxiety, dietary or dietary plan were populated in the field. The Metric (Found/Not Found) column 858 indicates that primary/secondary terms were not found. The Score column 860 included 0% computed score. This is an example, of a gap assessment. The HPA system 170 may return secondary words or primary words not identified as part of the search analysis.

The electronic medical record physician notes on patient progress and instructions provide information on the treatment approach used to treat various medical conditions. This embodiment may provide metrics that can be used to quantify the treatment given and its effectiveness. Evaluation of quality of care also requires use of electronic medical record physician notes on patient progress and instructions to evaluate the quality of treatment actually provided to patients against accepted standards of care. This embodiment may provide metrics that can be used to quantify the quality of treatment. Quality of care measurement also provides the necessary data for development of a knowledge retention model, for use in maintaining care standards when medical conditions have an infrequent occurrence rate, or the caregiver has reason to leave practice for a period of time.

In view of the foregoing, embodiments described herein may apply Natural Language Processing techniques to extract student/trainee performance data from unstructured and independent data sources to issue comprehensive performance assessments from multiple, inter-related but independent sources.

In view of the foregoing, the embodiments described herein may apply algorithms to extract only the assessment-relevant text from the multiple sources (corpora) using assessment domain ontologies (e.g., dictionaries, glossaries, thesauri), categorize the findings as evidence for specific student/trainee evaluations, perform assessment mappings, and assert KSA model conformance, success or failure.

In view of the foregoing, the embodiments described herein the HPA system 170 may also measure its own assessment success score by identifying when there is lack of data or insufficient (partial) data to conduct a student/trainee assessment. By way of non-limiting example, the HPA system 170 may be provided (from a SME or alike) with a list of primary and secondary terms that are related to an assessment topic. The HPA system 170 may verify if these terms were found and provide metrics on the search results. For example, if a SME expected for a Skill Topic the terms "target detection" and "time" and the system found all (both), only one or none, the system may score its own search as 100%, 50% or 0%, respectively.

In view of the foregoing, one or more types of the free-from assessment source data provides impartial and unbiased evaluation of cognitive performance. For example, video and audio recordings converted to text may be used as a cross-check for evaluations. The one or more types of the free-from assessment source data may include logs and session transcripts.

In embodiments, the assessments may be made available to managers in near real-time. For example, after the training session or performance session, the HPA system may provide an assessment report. In some embodiments, a real-time performance dashboard may be provided to immediately indicate gap performance of the training session.

In some embodiments, database queries such as for unstructured assessment source data may be performed without database structured query language (SQL) code or any other table query code.

Referring now to FIG. 9, in a basic configuration, the computing device 950 may include any type of stationary computing device or a mobile computing device. The computing device may be a computing system with one or more servers, each server including one or more processors. The term computing device and computing system may be interchangeable.

Computing device 950 may include one or more processors 952 and system memory in hard drive 954. Depending on the exact configuration and type of computing device, system memory may be volatile (such as RAM 956), non-volatile (such as read only memory (ROM 958), flash memory 960, and the like) or some combination of the two. System memory may store operating system 964, one or more applications, and may include program data for performing the processes 400 420, 440, and 460 described herein or one or more blocks of the processes by way of computer program instructions on a non-transitory and tangible computer readable medium. Computing device 950 may also have additional features or functionality. For example, computing device 950 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 950 may also include or have interfaces for input device(s) (not shown) such as a keyboard, mouse, pen, voice input device, touch input device, etc. The computing device 950 may include or have interfaces for connection to output device(s) such as a display 962, speakers, etc. The computing device 950 may include a peripheral bus 966 for connecting to peripherals. Computing device 950 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 950 may include a network interface card 968 to connect (wired or wireless) to a network.

Computer program code for carrying out operations described above may be written in a variety of programming languages, including but not limited to a high-level programming language, such as Java, C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

What is claimed is:
1. A system, comprising:
one or more processors and memory to:
maintain, in the memory, an assessment domain ontology (ADO) database defining, for each assessment topic of a plurality of assessment topics, a respective primary term indicative of a learning objective and a respective assessment criteria rule for scoring an achievement of the learning objective, each respective primary term associated with a corresponding plurality of secondary terms indicative of relevant performance parameters of the respective primary term;
receive, from a plurality of human performance training systems, performance data of a plurality of training events for a plurality of trainees, the performance data including unstructured data;

identify, in the performance data and using the ADO database, data indicative of assessment topics and corresponding primary and secondary terms in association with the plurality of trainees and the plurality of training events;

store, in the memory, performance records for the plurality of trainees and the plurality of training events using the data indicative of assessment topics and corresponding primary and secondary terms identified in the performance data;

receive, via an input device, an assessment query indicative of an assessment question related to a first trainee of the plurality of trainees;

parse, using the ADO database, the assessment query to identify a first primary term and one or more first secondary terms corresponding to the first primary term;

responsive to parsing the assessment query to identify the first primary term and the one or more first secondary terms, generate, using the assessment query and the ADO database, a search model including a plurality of data fields to be searched in the performance records, the plurality of data fields defined based on the first primary term and the one or more first secondary terms;

generate, using the search model and the performance records, an assessment report including information representing an answer to the assessment question; and provide the assessment report as output.

2. The system of claim 1, wherein the performance data include non-textual data and the one or more processors are configured to convert the non-textual data to textual data.

3. The system of claim 1, wherein the plurality of human performance training systems includes one or more of a live training system, a virtual simulation training system or a desktop simulator.

4. The system of claim 1, wherein the ADO database further includes synonyms of primary terms and secondary terms, and the one or more processors are configured to search for synonyms of the first primary term and the one or more first secondary terms in the assessment query.

5. The system of claim 1, wherein the ADO database further includes at least one of assessment gaps and interventions indicative of corrective actions to be taken by the plurality of trainees, and the assessment report includes a first assessment gap or a first corrective action associated with the first trainee.

6. The system of claim 1, wherein the performance data includes medical evaluations of the plurality of trainees.

7. The system of claim 1, wherein the performance data includes at least one of trainee notes or third-party notes.

8. The system of claim 1, wherein the one or more processors are configured to:
divide the performance data into tokens by dividing text data into keywords, key terms or predefined text string patterns; and
identify the data indicative of the plurality of assessment topics and the corresponding primary and secondary terms using the tokens.

9. The system of claim 1, wherein, for each assessment topic of the plurality of assessment topics, the respective primary term, the corresponding plurality of secondary terms and the respective assessment criteria rule are defined by a subject matter expert.

10. The system of claim 1, wherein the search model includes a temporal constraint data filed.

11. A method, comprising:

maintaining, by one or more processors in a memory, an assessment domain ontology (ADO) database defining, for each assessment topic of a plurality of assessment topics, a respective primary term indicative of a learning objective and a respective assessment criteria rule for scoring an achievement of the learning objective, each respective primary term associated with a corresponding plurality of secondary terms indicative of relevant performance parameters of the respective primary term;

receiving, by the one or more processors from a plurality of human performance training systems, performance data of a plurality of training events for a plurality of trainees, the performance data including unstructured data;

identifying, by the one or more processors in the performance data and using the ADO database, data indicative of assessment topics and corresponding primary and secondary terms in association with the plurality of trainees and the plurality of training events;

storing, by the one or more processors in the memory, performance records for the plurality of trainees and the plurality of training events using the data indicative of assessment topics and corresponding primary and secondary terms identified in the performance data;

receiving, by the one or more processors via an input device, an assessment query indicative of an assessment question related to a first trainee of the plurality of trainees;

parsing, by the one or more processors using the ADO database, the assessment query to identify a first primary term and one or more first secondary terms corresponding to the first primary term;

responsive to parsing the assessment query to identify the first primary term and the one or more first secondary terms, generating, by the one or more processors using the assessment query and the ADO database, a search model including a plurality of data fields to be searched in the performance records, the plurality of data fields defined based on the first primary term and the one or more first secondary terms;

generating, by the one or more processors using the search model and the performance records, an assessment report including information representing an answer to the assessment question; and providing, by the one or more processors, the assessment report as output.

12. The method of claim 11, wherein the performance data include non-textual data and the method further comprises converting the non-textual data to textual data.

13. The method of claim 11, wherein the plurality of human performance training systems includes one or more of a live training system, a virtual simulation training system or a desktop simulator.

14. The method of claim 11, wherein the ADO database further includes synonyms of primary terms and secondary terms, and the method further comprises searching for synonyms of the first primary term and the one or more first secondary terms in the assessment query.

15. The method of claim 11, wherein the ADO database further includes at least one of assessment gaps and interventions indicative of corrective actions to be taken by the plurality of trainees, and the assessment report includes a first assessment gap or a first corrective action associated with the first trainee.

16. The method of claim 11, wherein the performance data includes at least one of trainee notes, third-party notes or medical evaluations of the plurality of trainees.

17. The method of claim 11, comprising:
dividing the performance data into tokens by dividing text data into keywords, key terms or predefined text string patterns; and
identifying the data indicative of the plurality of assessment topics and the corresponding primary and secondary terms using the tokens.

18. The method of claim 11, wherein, for each assessment topic of the plurality of assessment topics, the respective primary term, the corresponding plurality of secondary terms and the respective assessment criteria rule are defined by a subject matter expert.

19. The method of claim 11, wherein the search model includes a temporal constraint data filed.

20. A non-transitory computer-readable storage medium having instructions stored thereon that, when executed by a computing system with one or more processors, cause the computing system to:
maintain, in a memory, an assessment domain ontology (ADO) database defining, for each assessment topic of a plurality of assessment topics, a respective primary term indicative of a learning objective and a respective assessment criteria rule for scoring an achievement of the learning objective, each respective primary term associated with a corresponding plurality of secondary terms indicative of relevant performance parameters of the respective primary term;
receive, from a plurality of human performance training systems, performance data of a plurality of training events for a plurality of trainees, the performance data including unstructured data;
identify, in the performance data and using the ADO database, data indicative of assessment topics and corresponding primary and secondary terms in association with the plurality of trainees and the plurality of training events;
store, in the memory, performance records for the plurality of trainees and the plurality of training events using the data indicative of assessment topics and corresponding primary and secondary terms identified in the performance data;
receive, via an input device, an assessment query indicative of an assessment question related to a first trainee of the plurality of trainees;
parse, using the ADO database, the assessment query to identify a first primary term and one or more first secondary terms corresponding to the first primary term;
responsive to parsing the assessment query to identify the first primary term and the one or more first secondary terms, generate, using the assessment query and the ADO database, a search model including a plurality of data fields to be searched in the performance records, the plurality of data fields defined based on the first primary term and the one or more first secondary terms;
generate, using the search model and the performance records, an assessment report including information representing an answer to the assessment question; and
provide the assessment report as output.

* * * * *